US008950779B2

(12) United States Patent
Inoue et al.

(10) Patent No.: US 8,950,779 B2
(45) Date of Patent: *Feb. 10, 2015

(54) ADJUSTER, FRAME AND VEHICLE

(71) Applicant: Yamaha Motor Power Products Kabushiki Kaisha, Kakegawa-shi, Shizuoka (JP)

(72) Inventors: Ryuta Inoue, Shizuoka (JP); Ken Itou, Shizuoka (JP); Yuya Sato, Newman, GA (US)

(73) Assignee: Yamaha Motor Power Products Kabushiki Kaisha, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/326,634

(22) Filed: Jul. 9, 2014

(65) Prior Publication Data

US 2014/0319793 A1 Oct. 30, 2014

Related U.S. Application Data

(62) Division of application No. 13/746,750, filed on Jan. 22, 2013, now Pat. No. 8,801,037.

(51) Int. Cl.
*B62D 21/11* (2006.01)
*B60G 5/04* (2006.01)
*B60G 3/06* (2006.01)
*B62D 21/00* (2006.01)
*B62D 21/12* (2006.01)
*B62D 21/18* (2006.01)
*B62D 25/08* (2006.01)
*B62D 23/00* (2006.01)

(52) U.S. Cl.
CPC .. *B60G 5/04* (2013.01); *B60G 3/06* (2013.01); *B62D 21/00* (2013.01); *B62D 21/12* (2013.01); *B62D 21/183* (2013.01); *B62D 25/088* (2013.01); *B60G 2200/142* (2013.01); *B60G 2300/13* (2013.01); *B62D 23/005* (2013.01)
USPC ............... 280/788; 280/787; 280/124.125

(58) Field of Classification Search
USPC ............... 280/788, 787, 124.125, 124.134
See application file for complete search history.

(56) References Cited

U.S. PATENT DOCUMENTS 6,698,775 B2 * 3/2004 Ness ................ 280/86.757
7,648,148 B1 * 1/2010 Mercier ............. 280/124.103
8,276,925 B2 * 10/2012 Varela et al. ......... 280/93.512

(Continued)

FOREIGN PATENT DOCUMENTS

JP 2001097237 A * 4/2001 ........... B62D 7/08

OTHER PUBLICATIONS

Inoue et al.; "Adjuster, Frame and Vehicle"; U.S. Appl. No. 13/746,750, filed Jan. 22, 2013.

*Primary Examiner* — Nicole Verley
(74) *Attorney, Agent, or Firm* — Keating & Bennett, LLP

(57) ABSTRACT

A golf cart includes a frame, an adjuster, and a pair of suspension assemblies that reduce changes in camber angles in a pair of wheels caused by an adjustment of a ground clearance. The adjuster includes a pair of first adjusting portions and a pair of second adjusting portions. Each of the first adjusting portions includes a first upper hole and a first lower hole. Each of the second adjusting portions includes a second upper hole and a second lower hole. Each suspension assembly includes a damper and an arm portion. When the golf cart is set to a high ground clearance, the first adjusting portions are installed between the frame and the dampers, and the second adjusting portions are installed between the frame and the arm portions.

4 Claims, 15 Drawing Sheets

(56) References Cited

U.S. PATENT DOCUMENTS

| | | | |
|---|---|---|---|
| 8,317,207 B2* | 11/2012 | Mercier | 280/124.103 |
| 2007/0257463 A1* | 11/2007 | Sanville et al. | 280/124.134 |
| 2007/0267837 A1* | 11/2007 | Sanville | 280/124.134 |
| 2007/0267838 A1* | 11/2007 | Sanville et al. | 280/124.134 |
| 2008/0067774 A1* | 3/2008 | Sanville et al. | 280/124.138 |
| 2011/0079459 A1* | 4/2011 | Gottschalk et al. | 180/400 |

* cited by examiner

ADJUSTER, FRAME AND VEHICLE

BACKGROUND OF THE INVENTION

1. Field of the Invention

The present invention relates to an adjuster, a frame and a vehicle, and more specifically to an adjuster, a frame and a vehicle capable of adjusting a positional relationship between the frame and suspension assemblies.

2. Description of the Related Art

There have been proposals for four-wheel vehicles having a ground clearance adjusting capability.

For example, US 2007/0267837 A1 discloses a golf cart, which includes a pair of front wheels, a support arm extending in the vehicle's width direction, a pair of frame members extending in the fore-aft direction, and a pair of sub-suspension assemblies. The support arm is placed above front end portions of the frame members, and is supported by the frame members via a pair of structural members.

Each of the sub-suspension assemblies includes a damper (strut assembly), a knuckle bracket and an arm. Each of the front wheels is rotatably supported by one of the knuckle brackets.

The pair of dampers in the pair of suspension assemblies have their upper end portions pivotably supported by two end portions of the support arm. The pair of dampers have their other lower end portions connected to their respective knuckle brackets.

The pair of arms in the pair of suspension assemblies have their inner end portions, in the vehicle's width direction, pivotably supported by front end portions of the pair of frame members via U-shaped members, etc. The pair of arms have their other outer end portions, in the vehicle's width direction, connected to their respective knuckle brackets.

The support arm includes a first hole and a second hole at each of their two end portions to support an end portion of the damper. The second holes are located at a lower position than the first holes. Therefore, if the second holes are used to support the dampers, it is possible to increase the vehicle's ground clearance, i.e., a height of the frame members from the ground surface, as compared to the case in which the first holes are used. With such an arrangement as the above, it is possible to adjust the golf cart's ground clearance by selecting from the first holes and the second holes depending on the front wheel diameter.

As described above, according to the golf cart disclosed in US 2007/0267837 A1, the ground clearance is adjustable by changing the position at which the pair of dampers are installed in the support arm. However, changing the position at which the dampers are installed sometimes significantly changes camber angles of the front wheels (tires). In this case, wheel alignment settings must be changed accordingly.

SUMMARY OF THE INVENTION

In order to overcome the problems described above, preferred embodiments of the present invention provide an adjuster, a frame and a vehicle capable of reducing changes in camber angles in a pair of wheels caused by adjustment of ground clearance.

According to a preferred embodiment of the present invention, an adjuster is arranged to adjust a ground clearance of a vehicle. The adjuster can be applied to a vehicle that includes a pair of strut suspension assemblies each including a damper, an arm portion, and a knuckle portion, for example. The adjuster includes a pair of first adjusting portions each including a first upper hole and a first lower hole. The first adjusting portions are arranged to be installed between the dampers and a frame of the vehicle to adjust a position of the frame with respect to the dampers. The adjuster further includes a pair of second adjusting portions each including a second upper hole and a second lower hole. The second adjusting portions are arranged to be installed between the arm portions and the frame at a height lower than the first adjusting portions to adjust a position of the frame with respect to the arm portions.

Generally, a vehicle which includes strut suspension assemblies includes a frame that includes holes to support the dampers (hereinafter, these holes will be referred to as upper supporting holes), and holes to support the arm portions (hereinafter, these holes will be referred to as lower supporting holes). The lower supporting holes are located at a lower height than the upper supporting holes. With the above, each of the dampers is pivotably supported by a support member (e.g., a bolt) inserted through the upper supporting hole, whereas each of the arm portions is pivotably supported by a support member (e.g., a bolt) inserted through the lower supporting hole. In such a vehicle, it is possible to adjust the vehicle's ground clearance by installing an adjuster according to preferred embodiments of the present invention between the frame and the suspension assemblies. Specifically, for example, each connecting member (e.g., a bolt) is inserted through the upper supporting hole and the first upper hole so as to connect the frame with the first adjusting portions, whereas each connecting member is inserted through the lower supporting hole and the second upper hole so as to connect the frame with the second adjusting portions. In this step, the first adjusting portions and the second adjusting portions are fixed to the frame such that the first lower holes are located at a lower height than the first upper holes and the second lower holes are located at a lower height than the second upper holes. Each support member inserted through the first lower hole of the first adjusting portion supports the damper pivotably, whereas each support member inserted through the second lower hole of the second adjusting portion supports the arm portion pivotably. The steps described above move the frame upward with respect to the dampers and also with respect to the arm portions as compared to the case before the adjuster is installed. As a result, it is possible to increase the ground clearance. As described above, when increasing the ground clearance by using the adjuster according to a preferred embodiment of the present invention, the frame is moved upward with respect to the dampers and with respect to the arm portions as well. In other words, it is possible to move both the dampers and the arm portions downward with respect to the frame. In this case, it is possible to reduce positional changes between the dampers and the arm portions before and after the adjuster is installed. Specifically, it is possible to reduce attitude changes of the suspension assemblies before and after the ground clearance adjustment. As a result, it is possible to reduce changes in the camber angles of the wheels supported by the suspension assemblies.

According to another preferred embodiment of the present invention, an adjuster is arranged to adjust a ground clearance of a vehicle. The adjuster can be applied to a vehicle that includes a pair of strut suspension assemblies each including a damper, an arm portion, and a knuckle portion, for example. The vehicle includes a frame including a pair of first adjusting portions to support the pair of dampers. Each of the pair of first adjusting portions includes a first upper hole and a first lower hole which is located at a height lower than the first upper hole, to support the damper. The adjuster includes a pair of second adjusting portions each including a second upper hole and a second lower hole. The second adjusting portions are arranged to be installed between the arm portions and the frame at a height lower than the first adjusting portions to adjust a position of the frame with respect to the arm portions.

When setting the ground clearance to low in a vehicle that includes a frame including the first upper holes and the first lower holes, the dampers are, for example, pivotably supported by support members inserted through the first upper holes. The arm portions are, for example, pivotably supported similar to the vehicle described above, by support members (e.g., bolts) inserted through the lower supporting holes in the frame. On the other hand, when setting the ground clearance to high, the dampers are, for example, pivotably supported by support members inserted through the first lower holes. The arm portions are supported by the frame similar to the vehicle described above, via the second adjusting portions. Specifically, connecting members inserted through the lower supporting holes and the second upper holes connect the frame with the second adjusting portions, whereas support members inserted through the second lower holes pivotably support the arm portions. Since the first lower holes are located at a lower position than the first upper holes, the dampers are moved downward with respect to the frame. Also similar to the vehicle described above, installing the second adjusting portions between the arm portions and the frame move the arm portions downward with respect to the frame. Specifically, when setting the ground clearance to high by using the adjuster according to a preferred embodiment of the present invention, it is possible to move not only the dampers but also the arm portions downward with respect to the frame. According to this arrangement, it is possible to reduce changes in a positional relationship between the dampers and the arm portions before and after the ground clearance adjustment. As a result, it is possible to reduce changes in the camber angles of the wheels supported by the suspension assemblies.

Preferably, the pair of first adjusting portions are integral with each other and are included in a first adjusting member. In this case, it is possible to fix the first adjusting member to the frame at least at two positions (e.g., the pair of first adjusting portions). This prevents the first adjusting member from rotating with respect to the frame. In other words, the arrangement prevents the pair of first adjusting portions from rotating with respect to the frame. This eliminates arrangements which are otherwise necessary to prevent rotation of the first adjusting portions, and makes it possible to reduce the number of parts required to install the adjuster to the frame. Also, the first adjusting member reinforces the frame.

Further preferably, the pair of second adjusting portions are integral with each other and are included in a second adjusting member. In this case, it is possible to fix the second adjusting member to the frame at least at two positions (e.g., the pair of second adjusting portions). This prevents the second adjusting member from rotating with respect to the frame. In other words, the arrangement prevents the pair of second adjusting portions from rotating with respect to the frame. This eliminates arrangements which are otherwise necessary to prevent rotation of the second adjusting portions, and makes it possible to reduce the number of parts required to install the adjuster to the frame. Also, the second adjusting member reinforces the frame.

According to still another preferred embodiment of the present invention, a vehicle frame is arranged to support a pair of strut suspension assemblies each including a damper, an arm portion and a knuckle portion. The frame includes a pair of first adjusting portions each including a first upper hole and a first lower hole and arranged to support the damper, and a pair of second adjusting portions each including a second upper hole and a second lower hole and arranged to support the arm portion at a height lower than the first adjusting portion.

When setting the ground clearance to low in a vehicle that includes a frame according to a preferred embodiment of the present invention, the dampers are, for example, pivotably supported by support members inserted through the first upper holes. The arm portions are, for example, pivotably supported by support members inserted through the second upper holes. On the other hand, when setting the ground clearance to high, the dampers are, for example, pivotably supported by support members inserted through the first lower holes. The arm portions are, for example, pivotably supported by support members inserted through the second lower holes. The first lower holes are located at a lower position than the first upper holes, whereas the second lower holes are located at a lower position than the second upper holes. Therefore, it is possible to move both the dampers and the arm portions downward with respect to the frame when setting the ground clearance to high. According to this arrangement, it is possible to reduce changes in a positional relationship between the dampers and the arm portions before and after the ground clearance adjustment. As a result, it is possible to reduce changes in the camber angles of the wheels supported by the suspension assemblies.

Preferably, each of the first lower holes is located outward of a location of the corresponding first upper hole and each of the second lower holes is located outward of a location of the corresponding second upper hole in the vehicle's width direction. In this case, since it is possible to move each of the suspension assemblies to an outer side of the vehicle when increasing the ground clearance, it is possible to move the wheels away from the vehicle frame. Thus, even if the wheels have an increased width, it is possible to prevent the wheels from making contact with the frame. As a result, this arrangement allows the use of larger wheels.

In a vehicle that includes a pair of strut suspension assemblies, it is preferable to reduce changes in camber angles of the wheels caused by a ground clearance adjustment. Therefore, the adjuster or the frame according to a preferred embodiment of the present invention, which reduces changes in camber angles of the wheels caused by a ground clearance adjustment, is suitably applied to vehicles.

Preferably, the vehicle further includes an operation controller, a pair of tie rods working in association with the operation controller and connected to the pair of knuckle portions in the pair of suspension assemblies, and a pair of spacers each placed between the tie rod and the knuckle portion. With this arrangement, each of the knuckle portions includes a connecting portion to connect to the tie rod, and each of the tie rods is connected to the connecting portion via the spacer. In this case, use of the pair of spacers enables height adjustment of tie rod end portions which are closer to the knuckles, depending on the ground clearance. This makes it possible to reduce curvature deformation of the tie rods when increasing the ground clearance. As a result, this arrangement makes it possible to transmit operations made to the operation controller smoothly to the wheels (knuckle portions).

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings. The description will use a golf cart 10 as a non-limiting example of a vehicle which includes an adjuster 14 according to a preferred embodiment of the present invention. The terms front and rear, right and left, up and down as used in describing the golf cart 10 are determined from the driver's position on a seat 62 of the golf cart 10, with the driver sitting while facing toward a steering wheel 64. Also, the term "outer side" will be used to mean an outer side of the golf cart 10 in terms of the left-right direction (width direction) of the vehicle when used without specific qualifying phrases.

Figure 1:
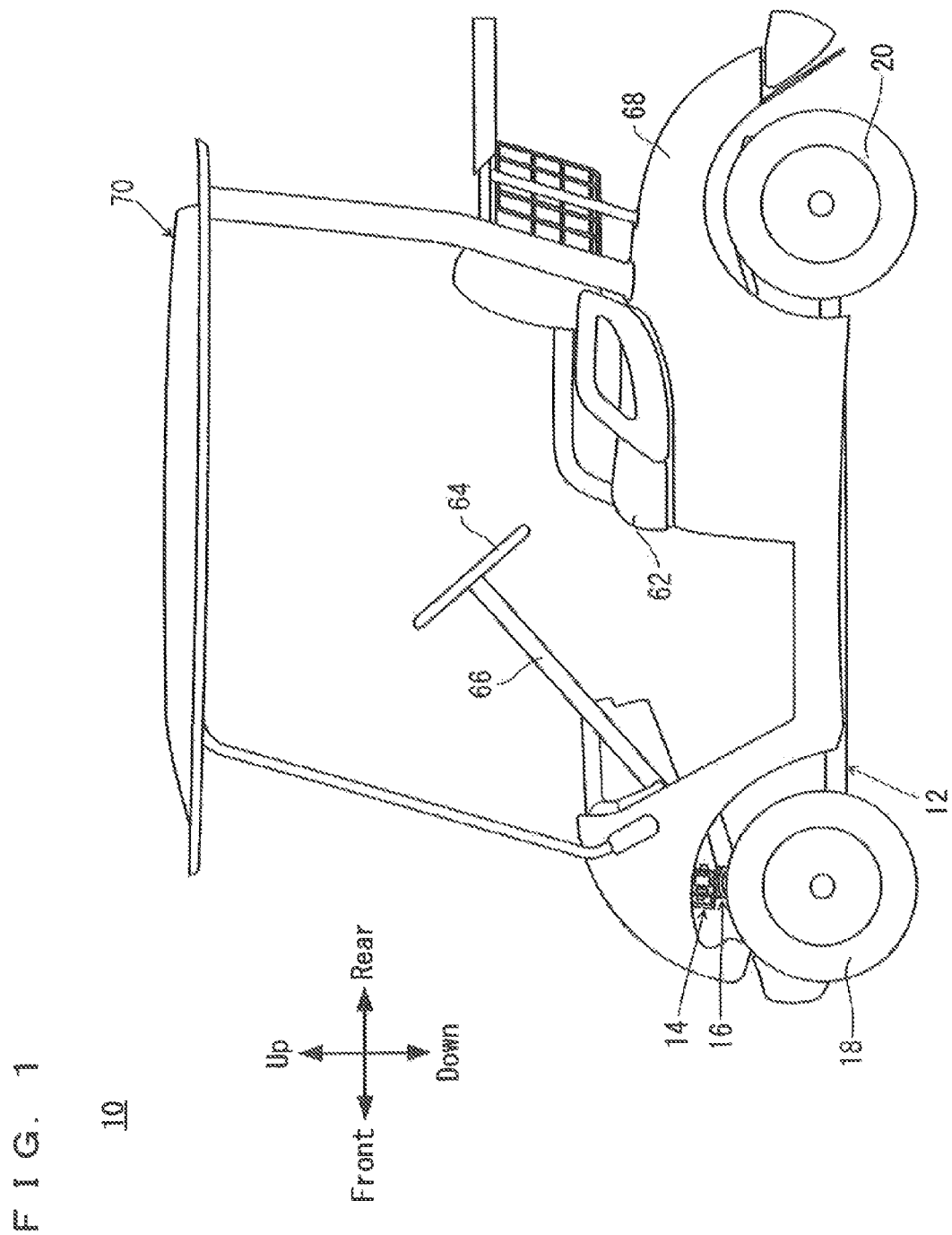
FIG. 1 is a side view of a golf cart including an adjuster according to a preferred embodiment of the present invention.
Figure 2:
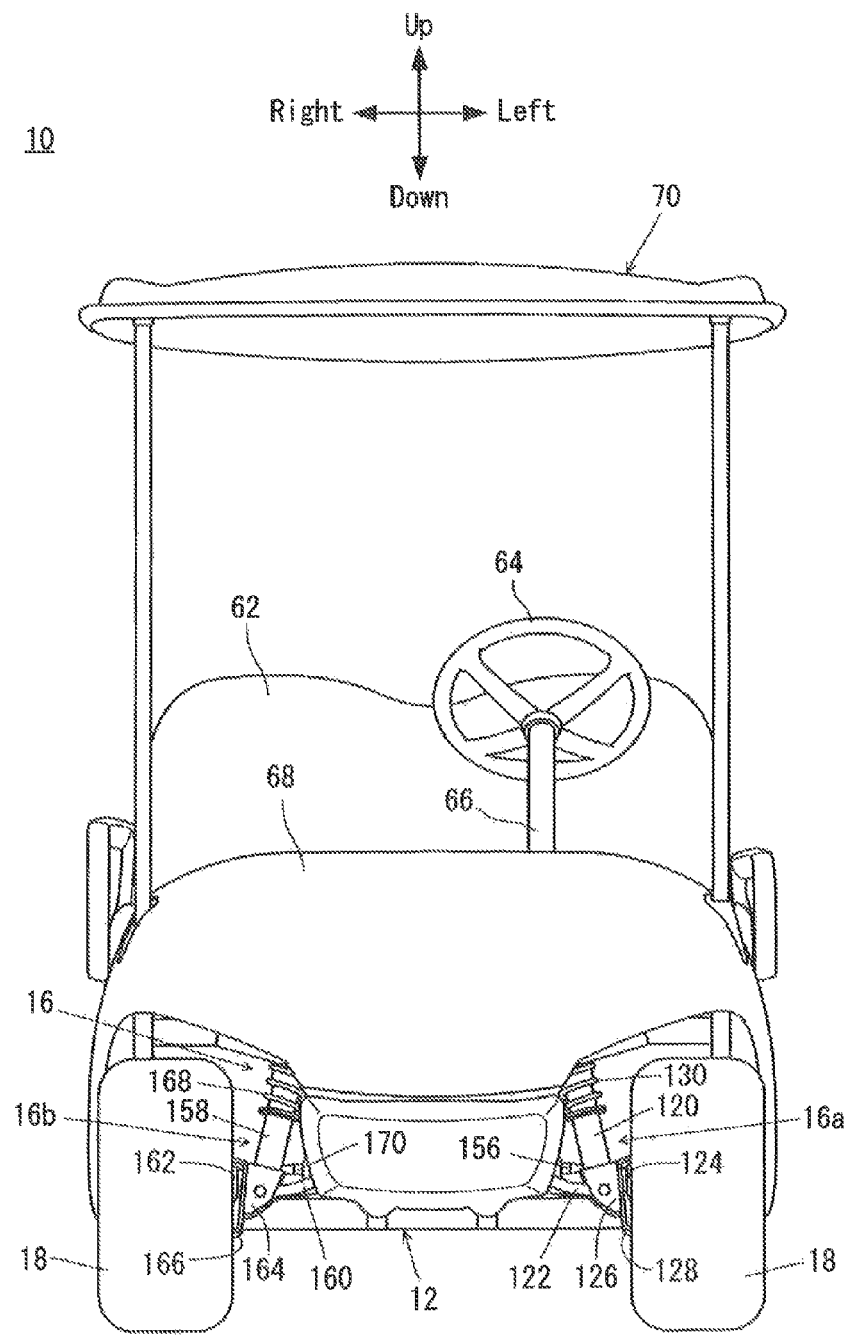
FIG. 2 is a front view of the golf cart.

FIG. 1 is a side view of the golf cart 10 whereas FIG. 2 is a front view of the golf cart 10.

Referring to FIG. 1 and FIG. 2, the golf cart 10 includes a frame 12, an adjuster 14 (see FIG. 1), a suspension unit 16, a pair of front wheels 18, and a pair of rear wheels 20. Each of the front wheels 18 and the rear wheels 20 includes a tire.

The suspension unit 16 includes a pair of strut suspension assemblies 16a, 16b (see FIG. 2) and is supported by the frame 12 via the adjuster 14. The front wheels 18 are rotatably supported by the suspension unit 16. More specifically, the suspension assembly 16a supports the left front wheel 18, whereas the suspension assembly 16b supports the right front wheel 18. The frame 12, the adjuster 14 and the suspension unit 16 will be described below. The rear wheels 20 are supported rotatably by the frame 12 via unillustrated support members, etc. It should be noted that the rear wheels 20 are supported by the frame 12 using a conventional arrangement known in various kinds of golf carts. Therefore, the structure that supports the rear wheels 20 will not be described herein.

Figure 3:
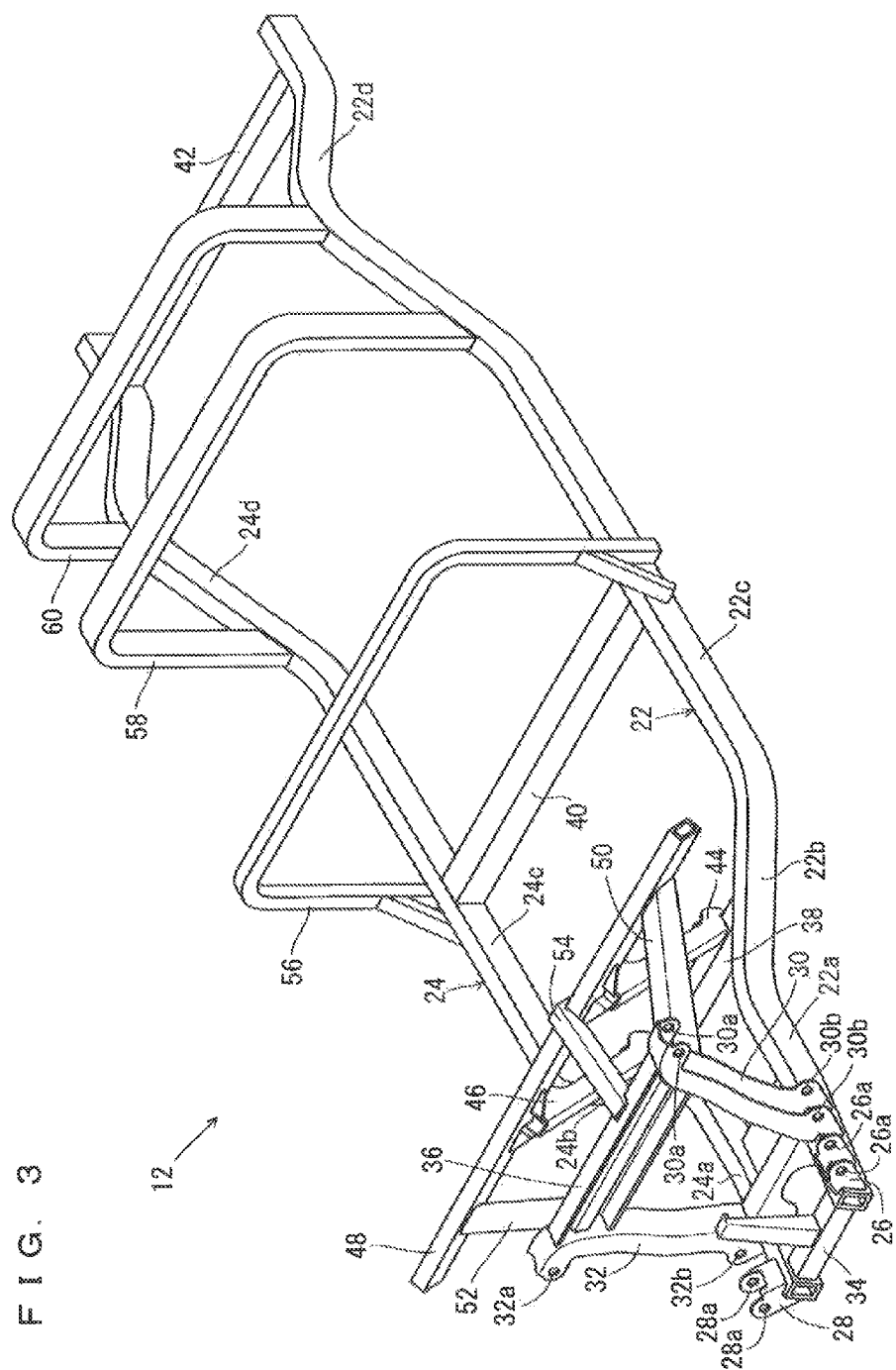
FIG. 3 is a perspective view of a frame of the golf cart.

FIG. 3 is a perspective view showing the frame 12.

Referring to FIG. 3, the frame 12 includes a pair of main frame members 22, 24 extending in a fore-aft direction. The main frame member 22 includes a first portion 22a, a second portion 22b, a third portion 22c and a fourth portion 22d. The first portion 22a extends rearward from a front end of the main frame member 22. The second portion 22b extends from a rear end of the first portion 22a obliquely rearward and toward an outer side of the golf cart 10. The third portion 22c extends rearward from a rear end of the second portion 22b. The fourth portion 22d extends rearward from a rear end of the third portion 22c so as to define an upwardly bulging curve.

Without going into details, the main frame member 24 has a shape that is left-right symmetrical to the main frame member 22, and includes a first portion 24a, a second portion 24b, a third portion 24c and a fourth portion 24d.

Figure 4:
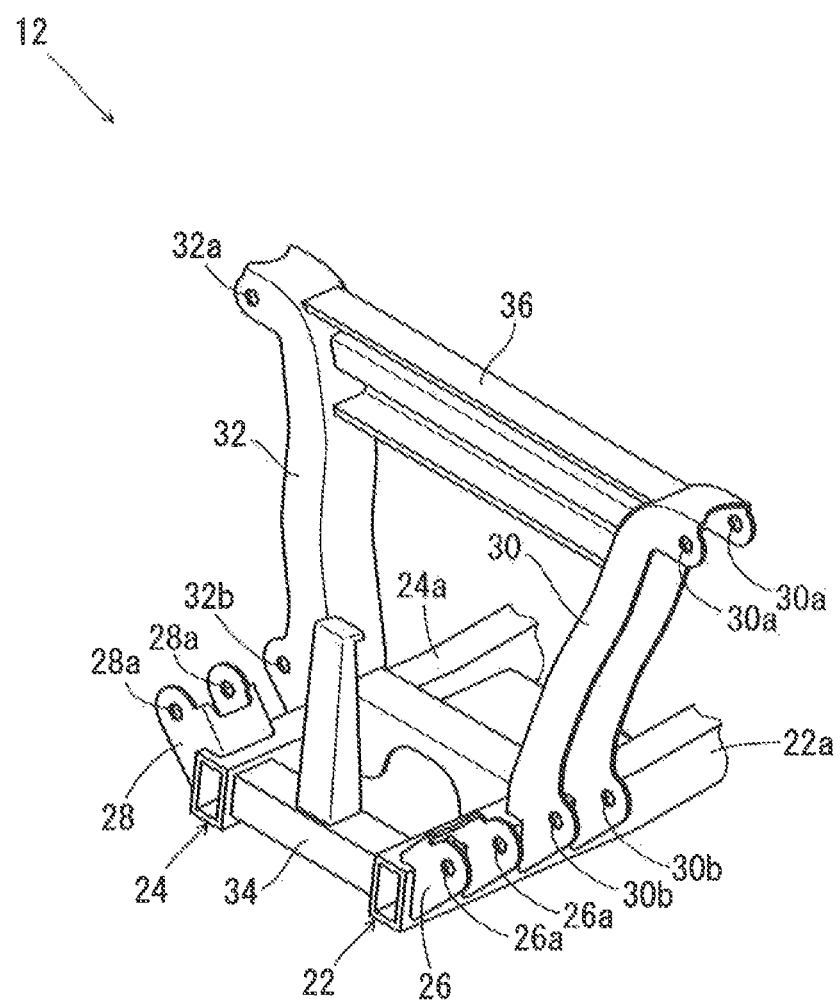
FIG. 4 is a perspective view, showing a front portion of the frame.

FIG. 4 is a perspective view, showing a front portion of the frame 12.

Referring to FIG. 3 and FIG. 4, the frame 12 further includes a pair of support frame members 26, 28 and a pair of support frame members 30, 32. The support frame member 26 is located at a front end portion of the main frame member 22 (first portion 22a). The support frame member 26 includes a substantially U-shaped section opening toward an outer side of the golf cart 10. The support frame member 26 includes a pair of lower supporting holes 26a opposed to each other in a fore-aft direction.

The support frame member 28 has a shape that is left-right symmetrical to the support frame member 26, and is placed at a front end portion of the main frame member 24 (first portion 24a). The support frame member 28 includes a pair of lower supporting holes 28a.

The support frame member 30 includes a substantially U-shaped section opening toward an outer side of the golf cart 10. The support frame member 30 is located at a position that is farther rearward than the support frame member 26 and extends upward from the main frame member 22 (first portion 22a). In the present preferred embodiment, the support frame member 30 extends upward while tilting rearward in a side view and tilting outward of the golf cart 10 in a front view. The support frame member 30 includes an upper end portion and a lower end portion protruding outward of the golf cart 10. The support frame member 30 includes a pair of upper supporting holes 30a opposed to each other in a fore-aft direction at its upper end portion, and a pair of lower supporting holes 30b opposed to each other in a fore-aft direction at its lower end portion.

The support frame member 32 has a shape that is left-right symmetrical to the support frame member 30. The support frame member 32 is located at a position that is farther rearward than the support frame member 28 and extends upward from the main frame member 24 (first portion 24a). The support frame member 32 includes a pair of upper supporting holes 32a (only a front upper supporting hole 32a is shown) at its upper end portion, and a pair of lower supporting holes 32b (only a front lower supporting hole 32b is shown) at its lower end portion.

In the present preferred embodiment, the support frame members 26, 30 are fixed to the main frame member 22, by welding, for example. Likewise, the support frame members 28, 32 are fixed to the main frame member 24, by welding, for example.

A cross member 34 connects the front end portion of the main frame member 22 and the front end portion of the main frame member 24 with each other. The cross member 34 is fixed to the main frame member 22, 24, by welding, for example.

A cross member 36 connects an upper portion of the support frame member 30 and an upper portion of the support frame member 32 with each other. In the present preferred embodiment, the cross member 36 is provided by a platy member which has a shape of a letter M (or E in general) when viewed from a side. The cross member 36 is fixed to the support frame members 30, 32, by welding, for example.

Referring to FIG. 3, a cross member 38 connects a front portion of the second portion 22b and a front portion of the second portion 24b with each other. A cross member 40 connects a substantially central region of the third portion 22c and a substantially central region of the third portion 24c with each other. A cross member 42 connects a rear region of the fourth portion 22d and a rear region of the fourth portion 24d with each other. The cross members 38, 40, 42 are fixed to the main frame members 22, 24, by welding, for example.

A pair of support frame members 44, 46 extend obliquely upward and forward from the cross member 38. The support frame members 44, 46 have their lower end portions fixed to the cross member 38, by welding, for example.

The upper end portions of the support frame members 44, 46 support a cross member 48, which extends in a left-right direction. The cross member 48 is fixed to the support frame members 44, 46, by welding, for example.

The cross member 36 and the cross member 48 are connected to each other by connection frame members 50, 52, 54. The connection frame member 50 extends from a left end portion of the cross member 36 in an obliquely leftward and rearward direction and is connected to the cross member 48. The connection frame member 52 extends from a right end portion of the cross member 36 in an obliquely rightward and rearward direction and is connected to the cross member 48. The connection frame member 54 extends rearward from the cross member 36 between the connection frame member 50 and the connection frame member 52 and is connected to the cross member 48. The connection frame members 50, 52, 54 are fixed to the cross members 36, 48, by welding, for example.

The third portion 22c and the third portion 24c are connected to each other by a support frame member 56, whereas the fourth portion 22d and the fourth portion 24d are connected to each other by support frame members 58, 60. Each of the support frame members 56, 58, 60 has a shape of an inverted letter U when viewed from the front. The support frame members 56, 58, 60 are fixed to the main frame members 22, 24, by welding, for example.

Referring to FIG. 1 through FIG. 3, the support frame members 56, 58 (see FIG. 3) support a seat 62. Referring to FIG. 1 and FIG. 2, a steering wheel 64 and a steering wheel shaft 66 are provided forward of the seat 62. The frame 12 is covered by a cover 68. A roof canopy 70 is provided above the seat 62, the steering wheel 64 and the steering wheel shaft 66. In the present preferred embodiment, the steering wheel 64 represents the operation controller.

Without going into details, a drive-power source (not illustrated) is below the seat 62. The drive-power source is provided by an engine or an electric motor, for example. In the present preferred embodiment the drive-power source generates a driving force, which rotates the rear wheels 20, for example, and thereby moves the golf cart 10.

Figure 5:
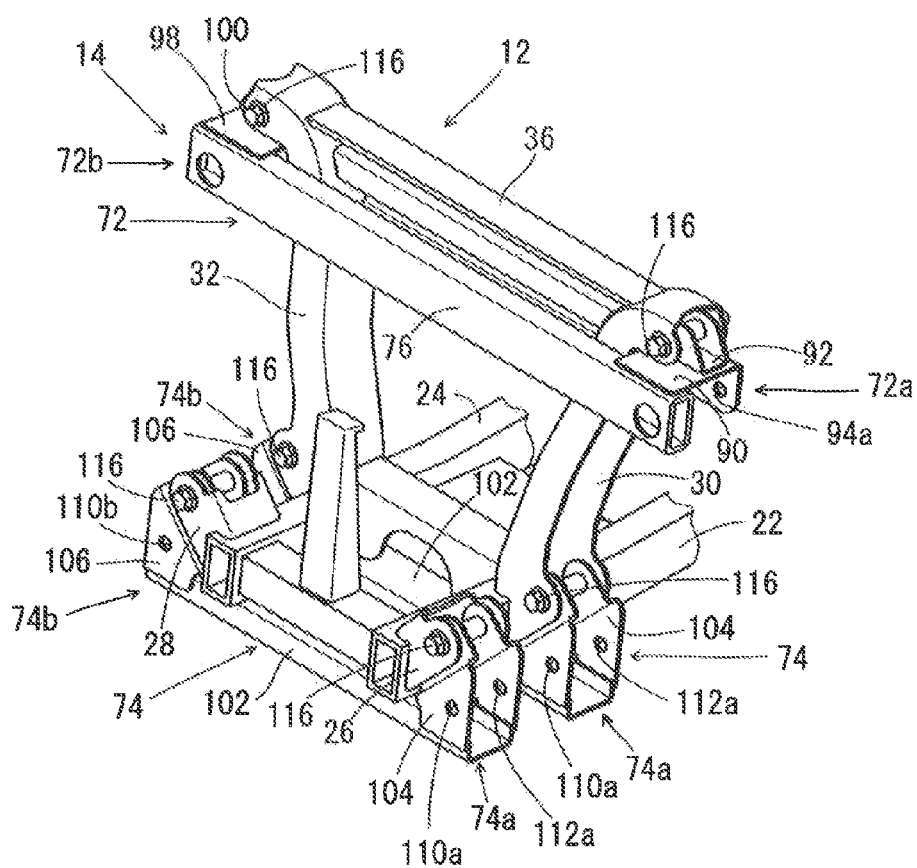
FIG. 5 is a perspective view, showing the front portion of the frame and the adjuster.

Next, the adjuster 14 will be described in detail. FIG. 5 is a perspective view, showing a front portion of the frame 12 and the adjuster 14.

Referring to FIG. 5, the adjuster 14 includes a first adjusting member 72 and a pair of second adjusting members 74. The first adjusting member 72 connects the upper end portion of the support frame member 30 and the upper end portion of the support frame member 32 with each other. The second adjusting members 74 are located at lower positions than the first adjusting member 72. Of the two second adjusting members 74, one (disposed in the front in the present preferred embodiment) connects the support frame member 26 and the support frame member 28 with each other while the other (disposed in the rear in the present preferred embodiment) connects the lower end portion of the support frame member 30 and the lower end portion of the support frame member 32 with each other.

Figure 6:
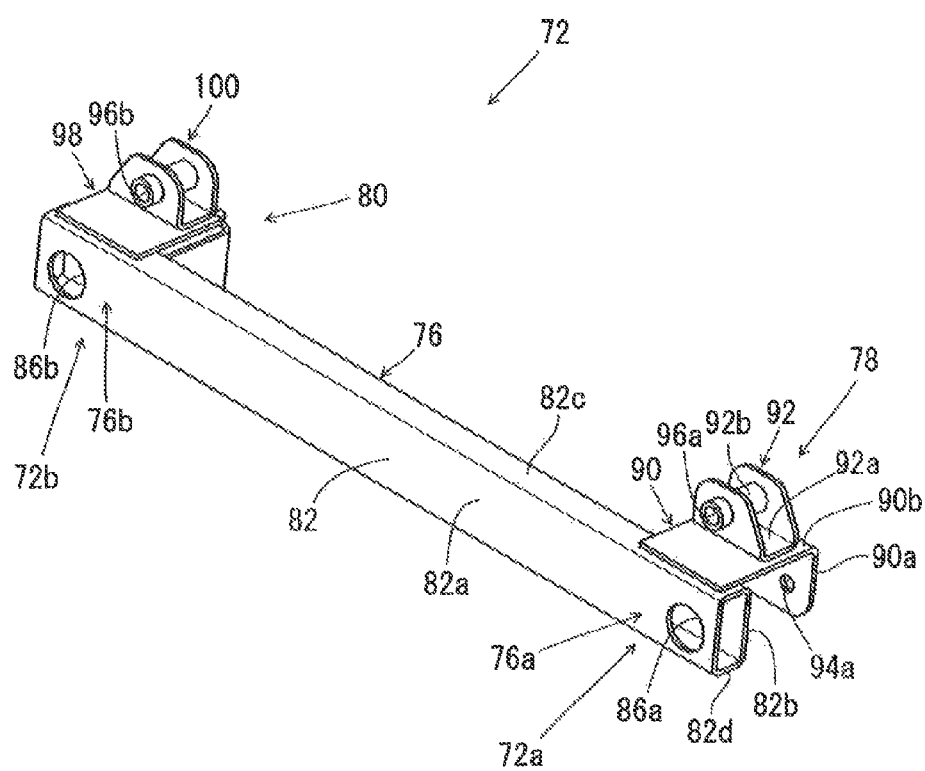
FIG. 6 is a perspective view, showing a first adjusting member.
Figure 7A:
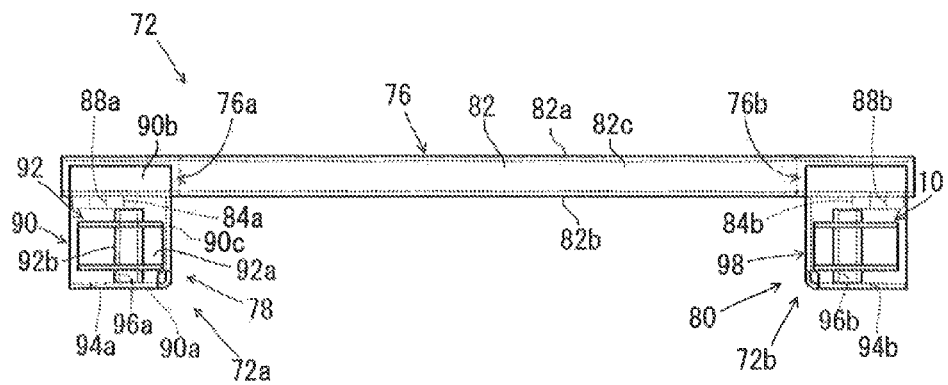
FIG. 7A is a plan view of the first adjusting member.
Figure 7B:
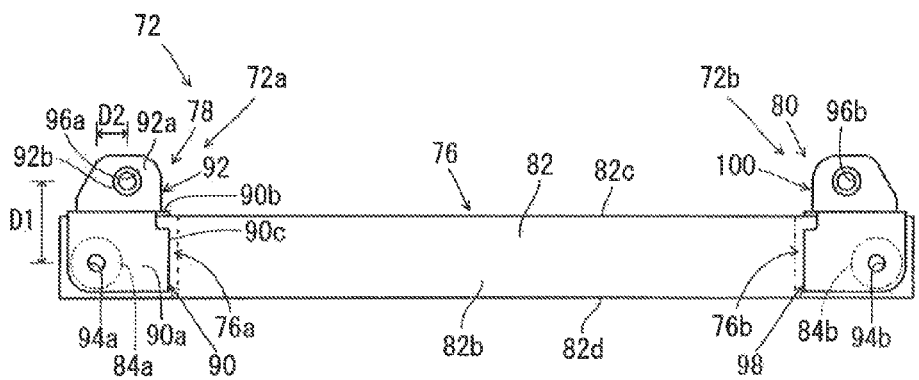
FIG. 7B is a rear view of the first adjusting member.

FIG. 6 is a perspective view (taken from a left-front view point) of the first adjusting member 72; FIG. 7A is a plan view of the first adjusting member 72; FIG. 7B is a rear view of the first adjusting member 72; and FIG. 7C is a side view (taken from a left side) of the first adjusting member 72.

Referring to FIG. 6 and FIG. 7A through FIG. 7C, the first adjusting member 72 includes an arm portion 76 and a pair of connecting portions 78, 80. Referring to FIG. 7A and FIG. 7B, in the present preferred embodiment, the arm portion 76 includes a first end portion 76a disposed on the left side of an alternate long and short dashed line; and a second end portion 76b which is disposed on the right side of an alternate long and two short dashed line. The connecting portion 78 is fixed to the first end portion 76a, whereas the connecting portion 80 is fixed to the second end portion 76b.

The first adjusting member 72 includes a pair of first adjusting portions 72a, 72b. In the present preferred embodiment, the first adjusting portion 72a includes the first end portion 76a and the connecting portion 78, whereas the first adjusting portion 72b includes the second end portion 76b and the connecting portion 80.

Figure 7C:
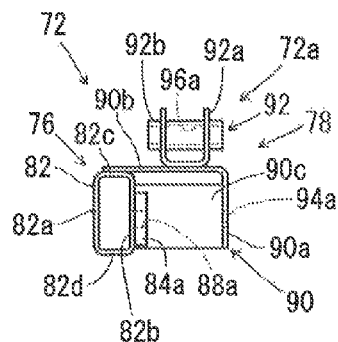
FIG. 7C is a side view of the first adjusting member.

Referring to FIG. 7A through FIG. 7C, the arm portion 76 includes a main body portion 82 and a pair of protruding portions 84a, 84b. Referring to FIG. 6 and FIG. 7A through FIG. 7C, the main body portion 82 preferably is substantially tubular with a rectangular or substantially rectangular cross-section, and includes platy portions 82a, 82b, 82c, 82d, for example. The platy portion 82a and the platy portion 82b oppose each other in a fore-aft direction and extend in an up-down direction. The platy portion 82a is located in front of the platy portion 82b. The platy portion 82c and the platy portion 82d oppose each other in an up-down direction and extend in a fore-aft direction. The platy portion 82c is above the platy portion 82d. Referring to FIG. 7A through FIG. 7C, the protruding portions 84a, 84b protrude rearward from the platy portion 82b. In the present preferred embodiment, the protruding portion 84a is disposed at the first end portion 76a, whereas the protruding portion 84b is disposed at the second end portion 76b. Referring to FIG. 6, the platy portion 82a includes work holes 86a, 86b. The work holes 86a, 86b correspond to first lower holes 88a, 88b (see FIG. 7A) which will be described below.

Referring to FIG. 7A and FIG. 7C, the arm portion 76 includes a plurality (for example, two, in the present preferred embodiment) of first lower holes 88a, 88b. Referring to FIG. 7A and FIG. 7C, the first lower hole 88a passes through the center of the protruding portion 84a, penetrating the protruding portion 84a and the platy portion 82b in a fore-aft direction. Referring to FIG. 7A, the first lower hole 88b passes through the center of the protruding portion 84b, penetrating the protruding portion 84b and the platy portion 82b in a fore-aft direction.

Referring to FIG. 6 and FIG. 7A through FIG. 7C, the connecting portion 78 includes a first connecting member 90 and a second connecting member 92. The first connecting member 90 includes platy portions 90a, 90b, 90c. The platy portion 90a is located behind the platy portion 82b and is parallel or substantially parallel to the platy portion 82b. The platy portion 90b extends forward from an upper edge of the platy portion 90a and is connected to an upper surface of the platy portion 82c. Referring to FIG. 7A through FIG. 7C, the platy portion 90c extends forward from a right edge of the platy portion 90a and is connected to the platy portion 82b. The platy portion 90b and the platy portion 90c are welded, for example, to the main body portion 82.

Referring to FIG. 7A through FIG. 7C, the platy portion 90a includes a first lower hole 94a. In the present preferred embodiment, the first lower hole 88a and the first lower hole 94a oppose each other in a fore-aft direction. In other words, the first lower hole 88a and the first lower hole 94a are concentric with each other.

Referring to FIG. 6 and FIG. 7A through FIG. 7C, the second connecting member 92 includes a platy portion 92a and a cylindrical portion 92b. The platy portion 92a is substantially U-shaped when viewed from a side, and is disposed on an upper surface of the platy portion 90b. The platy portion 92a is welded, for example, to the platy portion 90b. The cylindrical portion 92b penetrates the platy portion 92a in a fore-aft direction and is supported by the platy portion 92a. The cylindrical portion 92b is welded, for example, to the platy portion 92a. The cylindrical portion 92b includes a first upper hole 96a extending in a fore-aft direction. Referring to FIG. 7A through FIG. 7C, the first lower hole 88a and the first lower hole 94a are disposed at a lower position than the first upper hole 96a. The first lower holes 88a, 94a are located outward of a location of the first upper hole 96a in the width direction of the golf cart 10. Specifically, the first lower holes 88a, 94a are located obliquely below the first upper hole 96a. Referring to FIG. 7B, in the present preferred embodiment, the center of the first lower hole 94a (first lower hole 88a) and the center of the first upper hole 96a are spaced apart by a distance D1 in an up-down direction and by a distance D2 in a left-right direction (the width direction of the golf cart 10).

Referring to FIG. 6 and FIG. 7A through FIG. 7C, without getting into details, the connecting portion 80 has a shape that is left-right symmetrical to the connecting portion 78, and includes a first connecting member 98 and a second connecting member 100. Referring to FIG. 7A through FIG. 7C, the first connecting member 98 has a shape that is left-right symmetrical to the first connecting member 90, and includes a first lower hole 94b. In the present preferred embodiment, the first lower hole 88b and the first lower hole 94b oppose each other in a fore-aft direction. In other words, the first lower hole 88b and the first lower hole 94b are concentric with each other. The second connecting member 100 is left-right symmetrical to the second connecting member 92 in its shape, and includes a first upper hole 96b.

Figure 8:
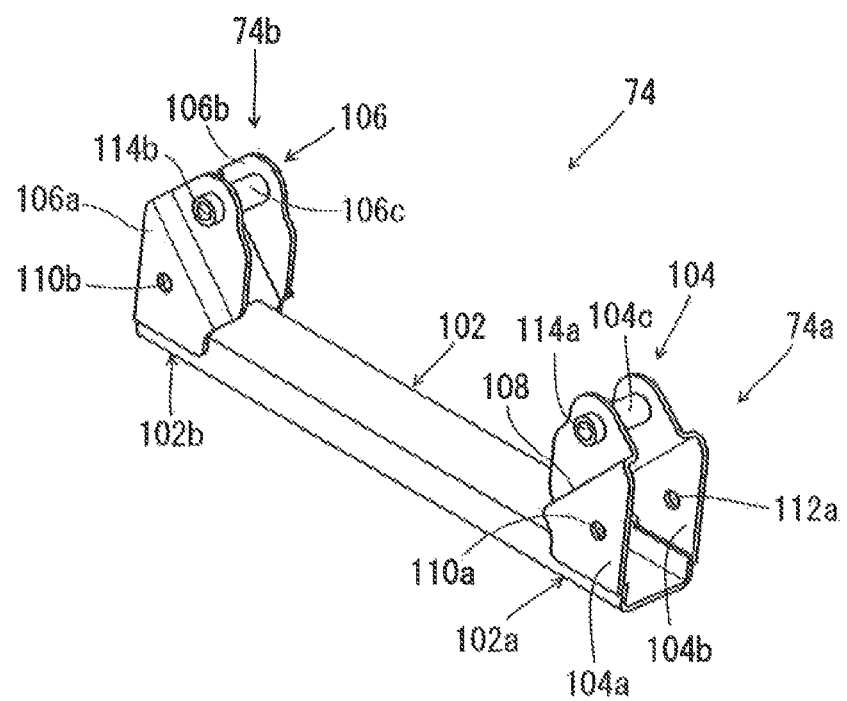
FIG. 8 is a perspective view, showing a second adjusting member.
Figure 9A:
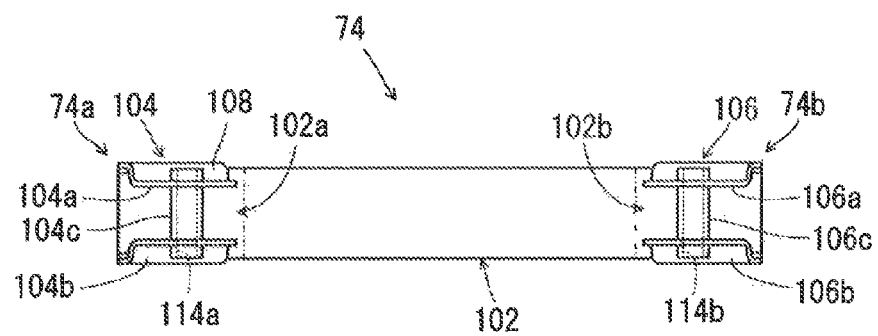
FIG. 9A is a plan view of the second adjusting member.
Figure 9B:
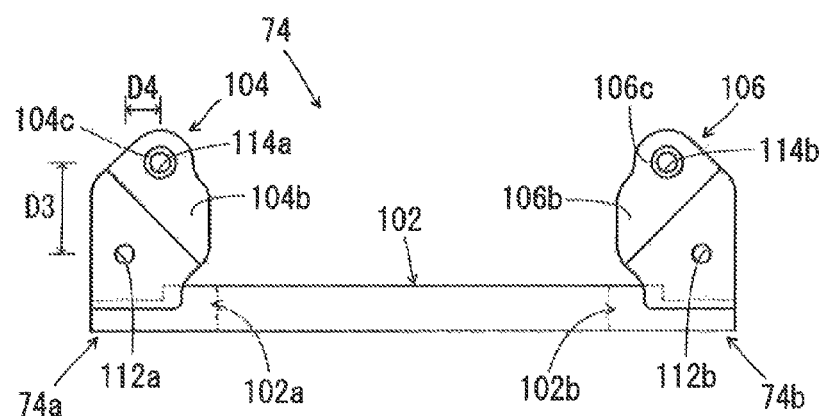
FIG. 9B is a rear view of the second adjusting member.

FIG. 8 is a perspective view (taken from a left-front view point) of the second adjusting member 74; FIG. 9A is a plan view of the second adjusting member 74; FIG. 9B is a rear view of the second adjusting member 74; and FIG. 9C is a side view (taken from a left side) of the second adjusting member 74.

Referring to FIG. 8 and FIG. 9A through FIG. 9C, the second adjusting member 74 includes an arm portion 102 and a pair of connecting portions 104, 106. Referring to FIG. 9A and FIG. 9B, in the present preferred embodiment, the arm portion 102 includes a first end portion 102a which is disposed on the left side of an alternate long and short dashed line; and a second end portion 102b which is disposed on the right side of an alternate long and two short dashed line. The connecting portion 104 is fixed to the first end portion 102a, whereas the connecting portion 106 is fixed to the second end portion 102b.

The second adjusting member 74 includes a pair of second adjusting portions 74a, 74b. In the present preferred embodiment, the second adjusting portion 74a includes the first end portion 102a and the connecting portion 104, whereas the second adjusting portion 74b includes the second end portion 102b and the connecting portion 106.

Figure 9C:
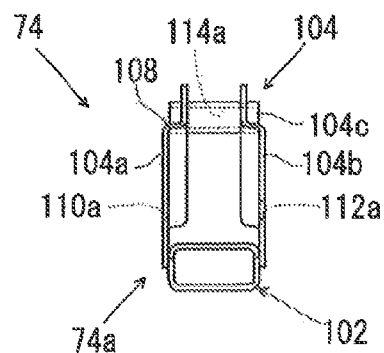
FIG. 9C is a side view of the second adjusting member.

Referring to FIG. 9B and FIG. 9C, the arm portion 102 preferably is substantially tubular with a rectangular or substantially rectangular cross-section, for example. In the present preferred embodiment, both end regions of the arm portion 102 have their upper portions cut away.

Referring to FIG. 8 and FIG. 9A through FIG. 9C, the connecting portion 104 includes a pair of platy portions 104a, 104b and a cylindrical portion 104c. The platy portions 104a, 104b are fixed to the first end portion 102a of the arm portion 102. In the present preferred embodiment, welding is preferably used, for example, to fix a lower end portion of the platy portion 104a to a front surface of the arm portion 102 and to fix a lower end portion of the platy portion 104b to a rear surface of the arm portion 102.

The platy portion 104a includes a rearwardly bent portion 108 in its generally central region. Referring to FIG. 8, the platy portion 104a further includes a second lower hole 110a. The second lower hole 110a is located at a lower position than the bent portion 108.

Referring to FIG. 8 and FIG. 9A through FIG. 9C, the platy portion 104b has a shape that is left-right symmetrical to the platy portion 104a, and includes a second lower hole 112a. The platy portion 104b is located behind the platy portion 104a and is opposed to the platy portion 104a in a fore-aft direction. The second lower hole 110a and the second lower hole 112a are opposed to each other in a fore-aft direction. In other words, the second lower hole 110a and the second lower hole 112a are concentric with each other.

The cylindrical portion 104c penetrates the platy portions 104a, 104b in a fore-aft direction and is supported by the platy portions 104a, 104b. The cylindrical portion 104c is welded, for example, to the platy portions 104a, 104b. The cylindrical portion 104c includes a second upper hole 114a extending in a fore-aft direction. The cylindrical portion 104c is supported by the platy portions 104a, 104b at a position higher than the second lower holes 110a, 112a. Therefore, the second lower holes 110a, 112a are located at a lower position than the second upper hole 114a. In the present preferred embodiment, the second lower holes 110a, 112a are located on an outer side that is outward of a location of the second upper hole 114a in the width direction of the golf cart 10. Specifically, the second lower holes 110a, 112a are located obliquely below the second upper hole 114a. Referring to FIG. 9B, the center of the second lower hole 112a (second lower hole 110a) and the center of the second upper hole 114a are spaced by a distance D3 in an up-down direction and by a distance D4 in a left-right direction (the width direction of the golf cart 10). The distance D3 may be equal to the distance D1 (see FIG. 7B), shorter than the distance D1, or longer than the distance D1. The distance D4 may be equal to the distance D2 (see FIG. 7B), shorter than the distance D2, or longer than the distance D2. Preferably, the distance D3 is equal to the distance D1 and the distance D4 is equal to the distance D2.

Without getting into details, the connecting portion 106 is left-right symmetrical to the connecting portion 104 in its shape, and includes a pair of platy portions 106a, 106b and a cylindrical portion 106c. Referring to FIG. 8, the platy portion 106a is left-right symmetrical to the platy portion 104a in its shape, and includes a second lower hole 110b. Referring to FIG. 9B, the platy portion 106b is left-right symmetrical to the platy portion 104b in its shape, and includes a second lower hole 112b. Referring to FIG. 8, FIG. 9A and FIG. 9B, the cylindrical portion 106c includes a second upper hole 114b extending in a fore-aft direction.

Referring to FIG. 4 through FIG. 6, the first adjusting member 72 is disposed in such a manner that the first upper hole 96a of the first adjusting portion 72a is located between the pair of upper supporting holes 30a of the support frame member 30, whereas the first upper hole 96b of the first adjusting portion 72b is located between the pair of upper supporting holes 32a of the support frame member 32. In this state, a bolt 116 is inserted through the upper supporting holes 30a and the first upper hole 96a, and the bolt 116 is threaded with a nut 118 (see FIG. 11 to be described below). Referring to FIG. 5, the first adjusting portion 72a is thus fixed to the upper end portion of the support frame member 30. Likewise, referring to FIG. 4 through FIG. 6, a bolt 116 is inserted through the upper supporting holes 32a and the first upper hole 96b, and the bolt 116 is threaded with a nut (not illustrated). Referring to FIG. 5, the first adjusting portion 72b is thus fixed to the upper end portion of the support frame member 32. In this way, the first adjusting member 72 is fixed to the frame 12.

Referring to FIG. 4, FIG. 5 and FIG. 8, the second adjusting member 74 in the front is disposed in such a manner that the second upper hole 114a of the second adjusting portion 74a is located between the pair of lower supporting holes 26a of the support frame member 26, whereas the second upper hole 114b of the second adjusting portion 74b is located between the pair of lower supporting holes 28a of the support frame member 28. In this state, a bolt 116 is inserted through the lower supporting holes 26a and the second upper hole 114a, and the bolt 116 is threaded with a nut 118 (see FIG. 11 to be described below). Referring to FIG. 5, the second adjusting portion 74a is thus fixed to the support frame member 26. Likewise, referring to FIG. 4, FIG. 5 and FIG. 8, a bolt 116 is inserted through the lower supporting holes 28a and the second upper hole 114b, and the bolt 116 is threaded with a nut (not illustrated). Referring to FIG. 5, the second adjusting portion 74b is thus fixed to the support frame member 28. In this way, the second adjusting member 74 in the front is fixed to the frame 12.

Referring to FIG. 4, FIG. 5 and FIG. 8, the second adjusting member 74 in the rear is disposed in such a manner that the second upper hole 114a of the second adjusting portion 74a is located between the pair of lower supporting holes 30b of the support frame member 30, whereas the second upper hole 114b of the second adjusting portion 74b is located between the pair of lower supporting holes 32b of the support frame member 32. In this state, a bolt 116 is inserted through the lower supporting holes 30b and the second upper hole 114a, and the bolt 116 is threaded with a nut (not illustrated). Referring to FIG. 5, the second adjusting portion 74a is thus fixed to the lower end portion of the support frame member 30. Likewise, referring to FIG. 4, FIG. 5 and FIG. 8, a bolt 116 is inserted through the lower supporting holes 32b and the second upper hole 114b, and the bolt 116 is threaded with a nut (not illustrated). Referring to FIG. 5, the second adjusting portion 74b is thus fixed to the lower end portion of the support frame member 32. In this way, the second adjusting member 74 in the rear is fixed to the frame 12.

Figure 10:
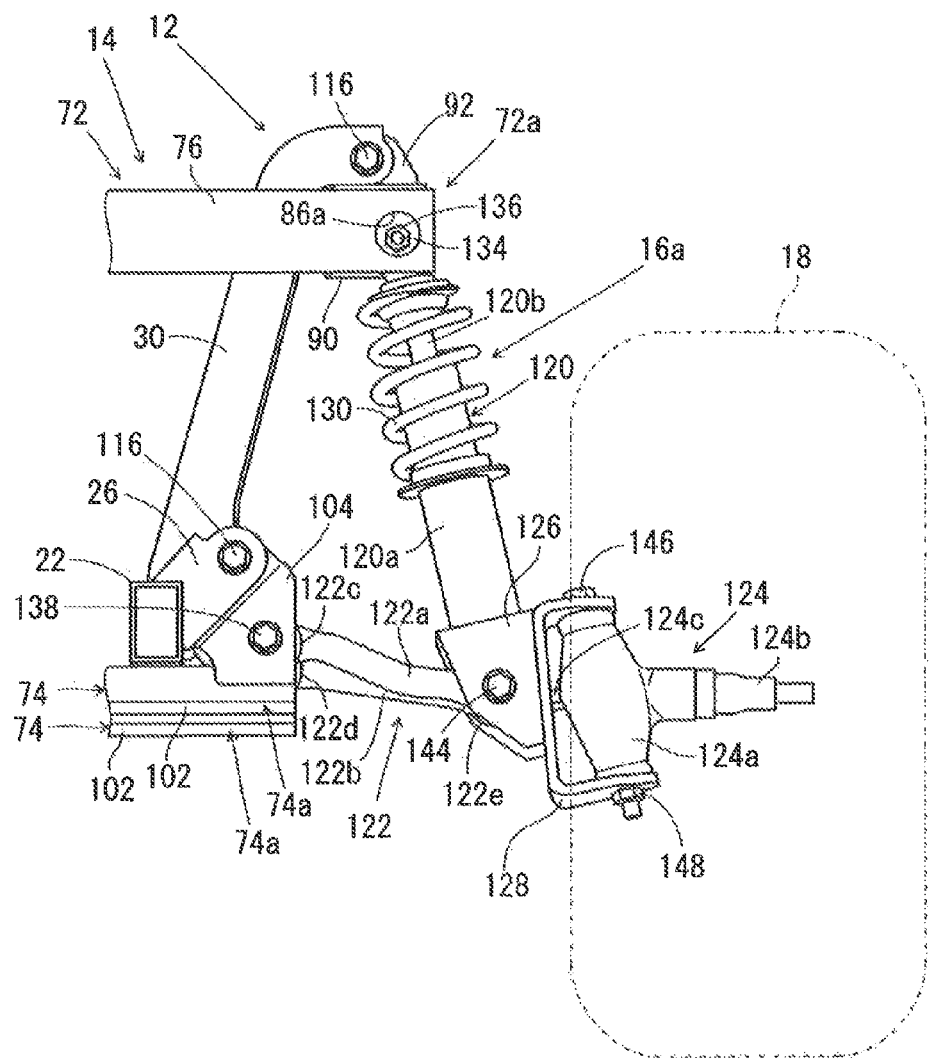
FIG. 10 is a front view, showing a relationship between the frame, the adjuster and a suspension assembly.
Figure 11:
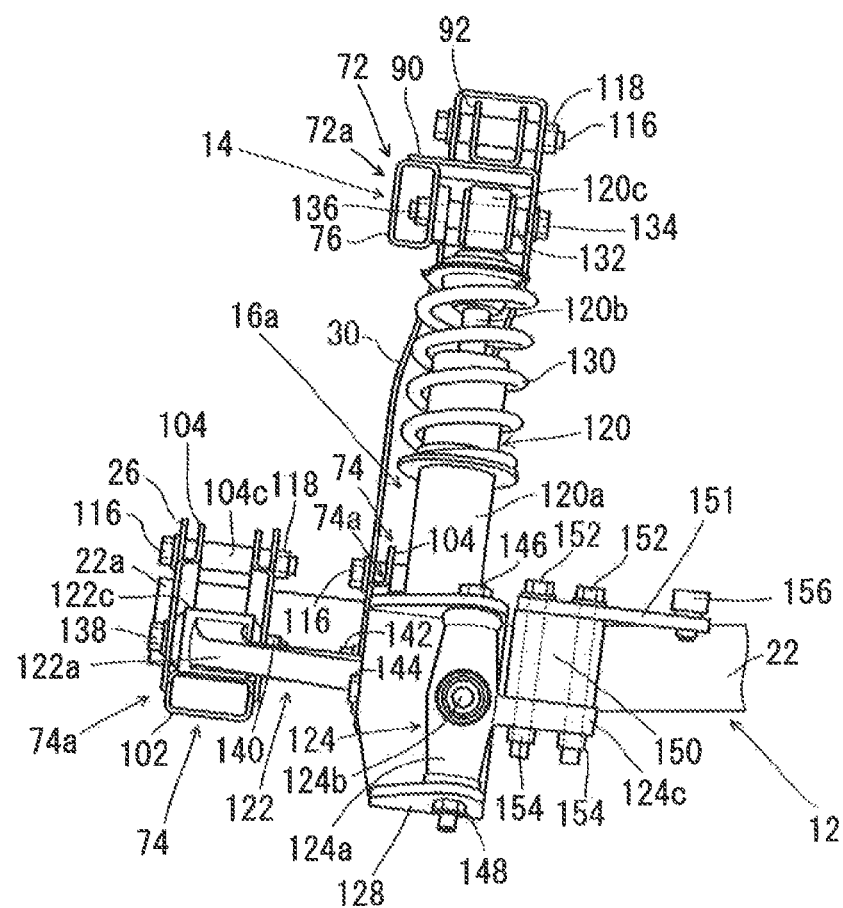
FIG. 11 is a side view, showing the relationship between the frame, the adjuster and the suspension assembly.

FIG. 10 is a front view, showing a relationship between the frame 12, the adjuster 14 and the suspension assembly 16a, whereas FIG. 11 is a side view (taken from a left side), showing the relationship between the frame 12, the adjuster 14 and the suspension assembly 16a.

Referring to FIG. 10 and FIG. 11, the suspension assembly 16a includes a damper 120, an arm portion 122, a knuckle portion 124, a bracket portion 126, a bracket portion 128 and a spring 130. It should be noted that the suspension assembly 16a may be a conventional suspension assembly. Therefore, the suspension assembly 16a will be described only briefly.

The damper 120 includes a cylinder 120a and a piston rod 120b. Referring to FIG. 11, the piston rod 120b includes a connecting portion 120c, which is annular in a front view, at its upper end portion. A cylindrical collar 132 is inserted through the connecting portion 120c. The connecting portion 120c and the collar 132 are disposed between the first lower hole 88a (see FIG. 7C) and the first lower hole 94a (see FIG. 7C). In this state, a bolt 134 is inserted through the first lower hole 94a, the collar 132 and the first lower hole 88a, and the bolt 134 is threaded with a nut 136. Thus, the damper 120 is pivotably supported by the first adjusting portion 72a via the collar 132 and the bolt 134. In other words, the damper 120 is pivotably supported by the frame 12 via the first adjusting portion 72a.

Referring to FIG. 10 and FIG. 11, the spring 130 is placed coaxially with the cylinder 120a and the piston rod 120b, and urges the cylinder 120a and the piston rod 120b to move away from each other.

The arm portion 122 is provided by an A-arm, for example, and includes a first arm 122a, a second arm 122b (see FIG. 10), a connecting portion 122c, a connecting portion 122d (see FIG. 10), and a connecting portion 122e (see FIG. 10). Referring to FIG. 10, the first arm 122a is at a more forward location than the second arm 122b. Referring to FIG. 10 and FIG. 11, the connecting portion 122c is connected to a first end portion (right end portion) of the first arm 122a. Referring to FIG. 10, the connecting portion 122d is connected to a first end portion (right end portion) of the second arm 122b. The connecting portion 122e is connected to a second end portion (left end portion) of the first arm 122a, and to a second end portion (left end portion) of the second arm 122b. All of the connecting portions 122c, 122d, 122e are preferably cylindrical or substantially cylindrical, for example.

Referring to FIG. 5, FIG. 10 and FIG. 11, the arm portion 122 is disposed in such a manner that the connecting portion 122c is located between the pair of second lower holes 110a, 112a of the second adjusting member 74 in the front, whereas the connecting portion 122d is located between the pair of second lower holes 110a, 112a of the second adjusting member 74 in the rear. In this state, a bolt 138 is inserted through the second lower holes 110a, 112a of the second adjusting member 74 in the front and the connecting portion 122c, and the bolt 138 is threaded with a nut 140. Also, a bolt 142 is inserted through the second lower holes 110a, 112a of the second adjusting member 74 in the rear and the connecting portion 122d, and the bolt 142 is threaded with a nut (not illustrated). Thus, the arm portion 122 is pivotably supported by the pair of second adjusting portions 74a. In other words, the arm portion 122 is pivotably supported by the frame 12 via the pair of second adjusting portions 74a.

Referring to FIG. 10, the bracket portion 126 has a shape of an inverted letter U when viewed from a side, and is fixed to a lower end portion of the cylinder 120a. The connecting portion 122e of the arm portion 122 is supported pivotably by the bracket portion 126 via a bolt 144 and a nut (not illustrated). Referring to FIG. 10 and FIG. 11, the bracket portion 128 has a shape of a letter C when viewed from the front, and is fixed to a left end portion of the bracket portion 126.

The knuckle portion 124 includes a generally cylindrical main body portion 124a, a generally columnar wheel shaft portion 124b extending from the main body portion 124a toward an outer side of the golf cart 10, and a platy connecting portion 124c extending rearward from the main body portion 124a. The main body portion 124a is supported pivotably by the bracket portion 128 using a bolt 146 and a nut 148. The wheel shaft portion 124b rotatably supports the front wheel 18 via unillustrated bearings, etc.

Referring to FIG. 11, a spacer 150 is disposed to extend upward from the connecting portion 124c. The spacer 150 has its upper end portion provided with a platy arm member 151. The arm member 151 extends rearward from the upper end portion of the spacer 150. In the present preferred embodiment, the spacer 150 and the arm member 151 are fixed to the connecting portion 124c preferably by a pair of bolts 152 and a pair of nuts 154, for example. The arm member 151 includes a rear end portion, where a tie rod 156 (FIG. 11 only shows a left end portion of the tie rod 156) is supported pivotably. Thus, the tie rod 156 is connected to the connecting portion 124c of the knuckle portion 124 via the arm member 151 and the spacer 150. Referring to FIG. 2, the tie rod 156 moves in a left-right direction in association with the steering wheel 64. A human driver's operation on the steering wheel 64 is thus transmitted to the knuckle portion 124 via the tie rod 156. This pivots the left front wheel 18 in a left-right direction.

Without going into details, the suspension assembly 16b is left-right symmetrical to the suspension assembly 16a in its configuration, and includes a damper 158, an arm portion 160, a knuckle portion 162, a bracket portion 164, a bracket portion 166 and a spring 168.

Without going into details, the damper 158 is supported like the damper 120, pivotably by the first adjusting portion 72b (see FIG. 5), using a collar (not illustrated), a bolt (not illustrated) and a nut (not illustrated). Thus, the damper 158 is pivotably supported by the frame 12 via the first adjusting portion 72b. This bolt is inserted through the first lower holes 88b, 94b (see FIG. 7A).

Without going into details, the arm portion 160 includes a pair of connecting portions (not illustrated) which are similar to the connecting portions 122c, 122d (see FIG. 10), at its left end portion. One of the connecting portions is supported pivotably by a bolt (not illustrated) which is inserted through the second lower holes 110b, 112b (see FIG. 8 and FIG. 9B) of the second adjusting portion 74b (see FIG. 5) in the front, whereas the other connecting portion is supported pivotably by a bolt (not illustrated) which is inserted through the second lower holes 110b, 112b (see FIG. 8 and FIG. 9B) of the second adjusting portion 74b (see FIG. 5) in the rear. Thus, the arm portion 160 is pivotably supported by the pair of second adjusting portions 74b. In other words, the arm portion 160 is pivotably supported by the frame 12 via the pair of second adjusting portions 74b.

The right front wheel 18 is rotatably supported by the knuckle portion 162. The knuckle portion 162 is essentially identical with the knuckle portion 124 (see FIG. 11), and is connected to a tie rod 170 via a spacer and an arm member which are essentially identical with the spacer 150 (see FIG. 11) and the arm member 151 (see FIG. 11). The tie rod 170 moves in a left-right direction in association with the steering wheel 64. This pivots the right front wheel 18 in a left-right direction.

Hereinafter, functions and advantages of the golf cart 10 will be described.

According to the golf cart 10, the ground clearance can be reduced by removing the adjuster 14 and installing the suspension unit 16 directly to the frame 12. Hereinafter, description will be made with reference to the drawings.

Figure 12:
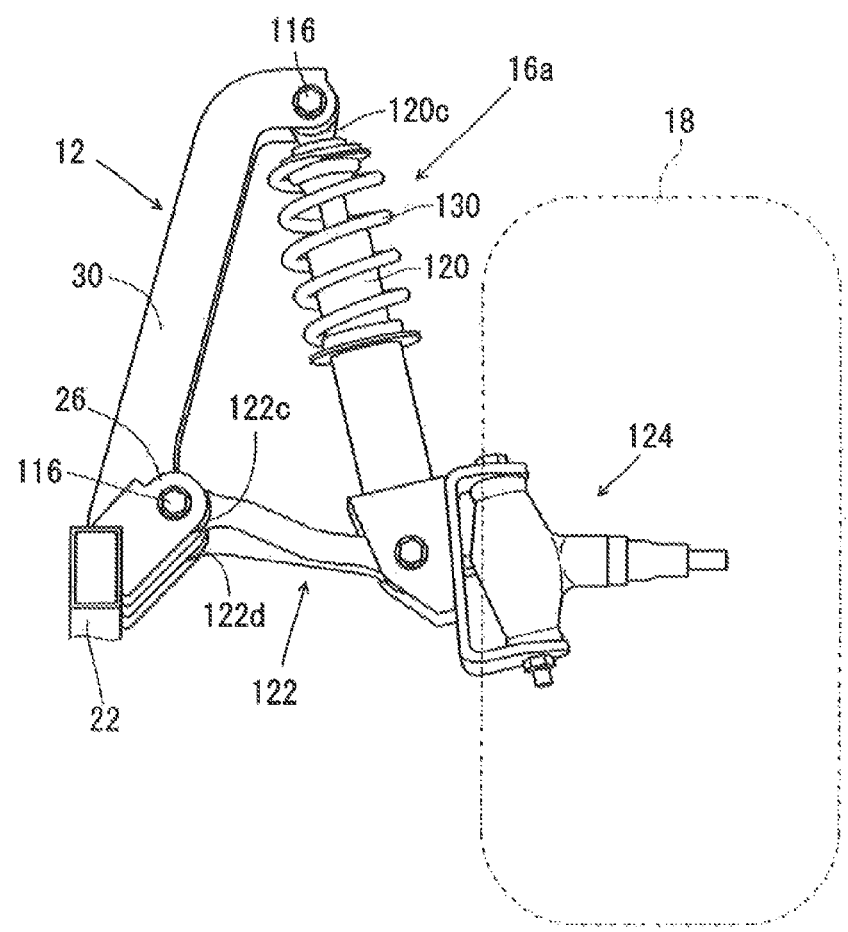
FIG. 12 is a front view, showing a state where the suspension assembly is installed directly to the frame.
Figure 13:
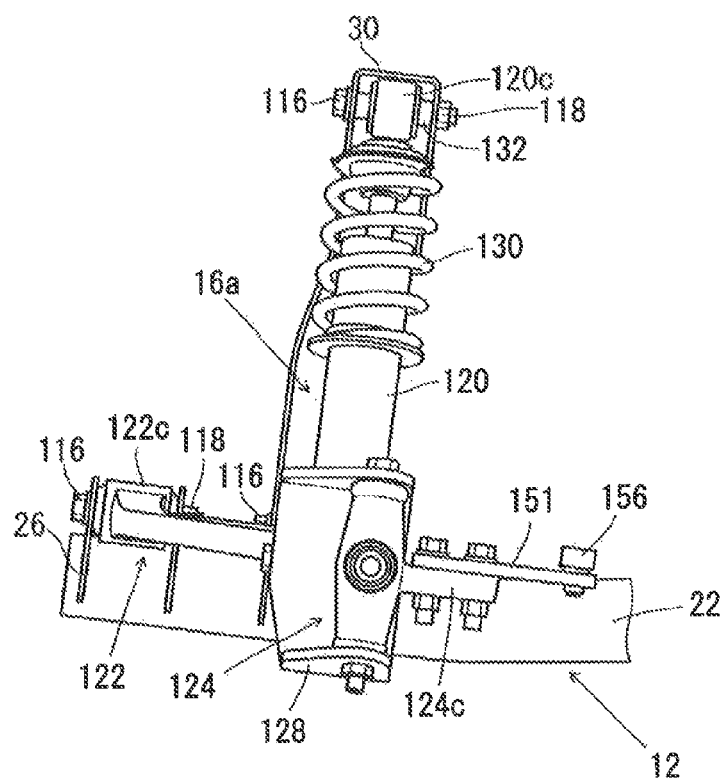
FIG. 13 is a side view, showing the state where the suspension assembly is installed directly to the frame.

FIG. 12 is a front view, showing a state where the suspension assembly 16a is installed directly to the frame 12, whereas FIG. 13 is a side view, showing the state where the suspension assembly 16a is installed directly to the frame 12.

Referring to FIG. 12 and FIG. 13, in the case where the suspension assembly 16a is installed directly to the frame 12, the connecting portion 120c of the damper 120 is connected to the upper end portion of the support frame member 30, the connecting portion 122c of the arm portion 122 is connected to the support frame member 26, and the connecting portion 122d of the arm portion 122 is connected to the lower end portion of the support frame member 30.

Specifically, referring to FIG. 4 and FIG. 13, the connecting portion 120c and the collar 132 are disposed between the pair of upper supporting holes 30a of the support frame member 30. Then, the bolt 116 is inserted through the upper supporting holes 30a and the collar 132, and the nut 118 is threaded around the bolt 116. Thus, referring to FIG. 12, the damper 120 is supported pivotably by the frame 12 (support frame member 30) via the bolt 116.

Referring to FIG. 4, FIG. 12 and FIG. 13, the connecting portion 122c is disposed between the pair of lower supporting holes 26a of the support frame member 26 while the connecting portion 122d is disposed between the pair of lower supporting holes 30b of the support frame member 30. Then, the bolt 116 is inserted through the lower supporting holes 26a and the connecting portion 122c, and the nut 118 is threaded around the bolt 116. Also, the bolt 116 is inserted through the lower supporting holes 30b and the connecting portion 122d, and the nut (not illustrated) is threaded around the bolt 116. Thus, the arm portion 122 is supported pivotably by the frame 12 (support frame member 26 and support frame member 30) via the pair of bolts 116.

Referring to FIG. 13, the spacer 150 (see FIG. 11) is not used when the suspension assembly 16a is installed directly to the frame 12. Specifically, the tie rod 156 is connected to the connecting portion 124c without using the spacer 150.

Now, referring to FIG. 4 through FIG. 6, when the first adjusting member 72 is disposed between the frame 12 and the damper 120, the first adjusting portion 72a is supported by the bolt 116 inserted through the pair of upper supporting holes 30a and the first upper hole 96a. Referring to FIG. 7A through FIG. 7C and FIG. 11, the connecting portion 120c of the damper 120 is supported by the bolt 134 inserted through the first lower holes 88a, 94a and the collar 132. As has been described, the first lower holes 88a, 94a are located at a lower position than the first upper hole 96a. Therefore, the connecting portion 120c is supported by the bolt 116, at a lower position than the upper supporting holes 30a.

On the other hand, referring to FIG. 4 and FIG. 13, when the first adjusting member 72 is not disposed between the frame 12 and the damper 120, the connecting portion 120c is supported by the bolt 116 inserted through the pair of upper supporting holes 30a and the collar 132. Therefore, the connecting portion 120c is supported by the bolt 116 at substantially the same height as the upper supporting holes 30a. Specifically, referring to FIG. 12 and FIG. 13, as the first adjusting member 72 is removed from between the frame 12 and the damper 120, the frame 12 (support frame member 30) is moved to a lower position with respect to the connecting portion 120c of the damper 120.

Referring to FIG. 4, FIG. 5 and FIG. 8, when the pair of second adjusting members 74 are installed between the frame 12 and the arm portion 122, the second adjusting portion 74a in the front is supported by the bolt 116 which is inserted through the pair of lower supporting holes 26a and the second upper hole 114a. The second adjusting portion 74a in the rear is supported by the bolt 116 inserted through the pair of lower supporting holes 30b and the second upper hole 114a. Referring to FIG. 5, FIG. 10 and FIG. 11, the connecting portion 122c of the arm portion 122 is supported by the bolt 138 inserted through the second lower holes 110a, 112a of the second adjusting portion 74a in the front. The connecting portion 122d of the arm portion 122 is supported by the bolt 142 inserted through the second lower holes 110a, 112a of the second adjusting portion 74a in the rear. As has been described, the second lower holes 110a, 112a are located at a lower position than the second upper hole 114a. Therefore, the connecting portion 122c is supported by the bolt 138 at a lower position than the pair of lower supporting holes 26a, whereas the connecting portion 122d is supported by the bolt 142 at a lower position than the pair of lower supporting holes 30b.

On the other hand, referring to FIG. 4, FIG. 12 and FIG. 13, when the pair of second adjusting members 74 are not installed between the frame 12 and the arm portion 122, the connecting portion 122c is supported by the bolt 116 inserted through the pair of lower supporting holes 26a, whereas the connecting portion 122d is supported by the bolt 116 inserted through the pair of lower supporting holes 30b. Therefore, the connecting portion 122c is supported by the bolt 116 at substantially the same height as the pair of lower supporting holes 26a, whereas the connecting portion 122d is supported by the bolt 116 at substantially the same height as the pair of lower supporting holes 30b. Specifically, referring to FIG. 12 and FIG. 13, as the pair of second adjusting members 74 are removed from between the frame 12 and the arm portion 122, the frame 12 (support frame member 26 and support frame member 30) is moved to a lower position with respect to the connecting portions 122c, 122d of the arm portion 122.

Referring to FIG. 2, without going into details, the suspension assembly 16b is installed to the frame 12 in the same manner as is the suspension assembly 16a. Therefore, as the first adjusting member 72 is removed from the frame 12, the frame 12 is moved to a lower position with respect to the damper 158. Likewise, as the pair of second adjusting members 74 are removed from the frame 12, the frame 12 is moved to a lower position with respect to the arm portion 160. As a result of these structural features, the frame 12 moves to a lower position with respect to the suspension unit 16. Specifically, the golf cart 10 achieves a reduced ground clearance.

As described above, according to the golf cart 10, it is possible, by removing the adjuster 14, to move the frame 12 to a lower position with respect to the dampers 120, 158 while moving it also to a lower position with respect to the arm portions 122, 160 as well. In other words, it is possible to move the dampers 120, 158 and the arm portions 122, 160 as well, to an upper position with respect to the frame 12. In this case, the arrangement reduces positional changes between the damper 120 and the arm portion 122, and positional changes between the damper 158 and the arm portion 160 as well, before and after the adjuster 14 is removed. Specifically, it is possible to reduce attitude changes of the suspension assemblies 16a, 16b before and after the ground clearance adjustment of the golf cart 10. As a result, the arrangement reduces changes in the camber angles of the front wheels 18 which are supported by the suspension assemblies 16a, 16b. In particular, when the distance D1 (see FIG. 7B) and the distance D3 (see FIG. 9B) are equal to each other and the distance D2 (see FIG. 7B) and the distance D4 (see FIG. 9B) are equal to each other as well, the positional relationship does not change between the damper 120 and the arm portion 122, nor between the damper 158 and the arm portion 160 before and after the adjuster 14 is removed. Thus, it is possible to prevent changes in the camber angles of the front wheels 18.

If the ground clearance of the golf cart 10, from which the adjuster 14 has been removed, needs to be increased, then this will be achieved by simply re-installing the adjuster 14 between the dampers 120, 158 and the frame 12, and between the arm portions 122, 160 and the frame 12. More specifically, it will be achieved simply by installing the first adjusting portion 72a between the damper 120 and the support frame member 30; installing the first adjusting portion 72b between the damper 158 and the support frame member 32; installing the pair of second adjusting portions 74a between the arm portion 122 and the support frame members 26, 30; and installing the pair of second adjusting portions 74b between the arm portion 160 and the support frame members 28, 32. With this set of operations, it is possible to increase the ground clearance of the golf cart 10.

It should be noted that relative movement of the frame 12 and the suspension unit 16 when installing the adjuster 14 between the frame 12 and the suspension unit 16 is the reverse of the movement of the frame 12 and the suspension unit 16 when removing the adjuster 14. Therefore, according to the golf cart 10, it is possible, by installing the adjuster 14, to move the frame 12 to a higher position with respect to the dampers 120, 158 while moving it also to a higher position with respect to the arm portions 122, 160 as well. In other words, it is possible to move the dampers 120, 158 and the arm portions 122, 160 as well, to a lower position with respect to the frame 12. In this case, it is possible to reduce changes in the positional relationship between the damper 120 and the arm portion 122 and changes in the positional relationship between the damper 158 and the arm portion 160, before and after the adjuster 14 is installed. Specifically, it is possible to reduce attitude changes in the suspension assemblies 16a, 16b before and after the ground clearance adjustment of the golf cart 10. As a result, it is possible to reduce changes in the camber angles of the front wheels 18 which are supported by the suspension assemblies 16a, 16b. In particular, if the distance D1 and the distance D3 are equal to each other and the distance D2 and the distance D4 are equal to each other as well, there is no change in the positional relationship between the damper 120 and the arm portion 122, nor between the damper 158 and the arm portion 160 before and after the adjuster 14 is installed. Thus, it is possible to prevent changes in the camber angles of the front wheels 18.

The first adjusting portions 72a, 72b are preferably integral with each other and included in the first adjusting member 72. In this case, it is possible to fix the first adjusting member 72 to the frame 12 at least at two positions (the first adjusting portions 72a, 72b). This prevents the first adjusting member 72 from rotating with respect to the frame 12. In other words, the arrangement prevents the first adjusting portions 72a, 72b from rotating with respect to the frame 12. This eliminates arrangements which are otherwise necessary to prevent rotation of the first adjusting portions 72a, 72b, and makes it possible to reduce the number of parts required to install the adjuster 14 to the frame 12. Also, the first adjusting member 72 reinforces the frame 12.

The second adjusting portions 74a, 74b are preferably integral with each other and included in the second adjusting member 74. In this case, it is possible to fix the second adjusting member 74 to the frame 12 at least at two positions (the second adjusting portions 74a, 74b). This prevents the second adjusting member 74 from rotating with respect to the frame 12. In other words, the arrangement prevents the second adjusting portions 74a, 74b from rotating with respect to the frame 12. This eliminates arrangements which are otherwise necessary to prevent rotation of the second adjusting portions 74a, 74b, and makes it possible to reduce the number of parts required to install the adjuster 14 to the frame 12. Also, the second adjusting member 74 reinforces the frame 12.

Referring to FIG. 7A through FIG. 7C, in the first adjusting portion 72a, the first lower holes 88a, 94a are located outward of a location of the first upper hole 96a. In the first adjusting portion 72b, the first lower holes 88b, 94b are located outward of a location of the first upper hole 96b. Likewise, referring to FIG. 8 and FIG. 9A through FIG. 9C, in the second adjusting portion 74a, the second lower holes 110a, 112a are located outward of a location of the second upper hole 114a. In the second adjusting portion 74b, the second lower holes 110b, 112b are located outward of a location of the second upper hole 114b. Therefore, in the case where the adjuster 14 is installed between the frame 12 and the suspension unit 16, it is possible to dispose each of the suspension assemblies 16a, 16b farther outward than in the case where the adjuster 14 is not installed. Specifically, it is possible to place the front wheels 18 at positions farther from the frame 12. Thus, even if the front wheels 18 have an increased width, it is possible to prevent the front wheels 18 from making contact with the frame 12. As a result, the above arrangement allows the use of larger front wheels 18.

Referring to FIG. 11, in the case where the golf cart 10 has the adjuster 14 installed, the tie rod 156 is connected to the connecting portion 124c of the knuckle portion 124 via the spacer 150. Likewise, referring to FIG. 2, the tie rod 170 is connected to the connecting portion (not illustrated) of the knuckle portion 162 via the spacer (not illustrated). On the other hand, in the case where the adjuster 14 is removed from the golf cart 10, the spacer 150 is removed from between the tie rod 156 and the knuckle portion 124, and the unillustrated spacer is removed from between the tie rod 170 and the knuckle portion 162. As has been described, the use of a pair of spacers enables a height adjustment of the tie rods 156, 170 at their end portions which are closer to the knuckle portions 124, 162, depending on the ground clearance of the golf cart 10. This makes it possible to reduce curvature deformation of the tie rods 156, 170 when adjusting the ground clearance of the golf cart 10. As a result, the arrangement makes it possible to transmit operations to the steering wheel 64 smoothly to the front wheels 18 (knuckle portions 124, 162).

In the preferred embodiments described above, the pair of first adjusting portions 72a, 72b are preferably integral with each other and included in the first adjusting member 72; and the pair of second adjusting portions 74a, 74b are preferably integral with each other and included in the second adjusting member 74. However, the configuration of the pair of first adjusting portions or the configuration of the pair of second adjusting portions is not limited to those in the preferred embodiments described above. For example, the pair of first adjusting portions need not necessarily be integral with each other. The pair of second adjusting portions need not necessarily be integral with each other, either.

In the preferred embodiments described above, description was made for a case in which the first adjusting member 72 of the adjuster 14 is preferably fixed to the support frame members 30, 32 of the frame 12. However, the configuration of the frame or of the adjuster is not limited to the preferred embodiments described above.

Figure 14:
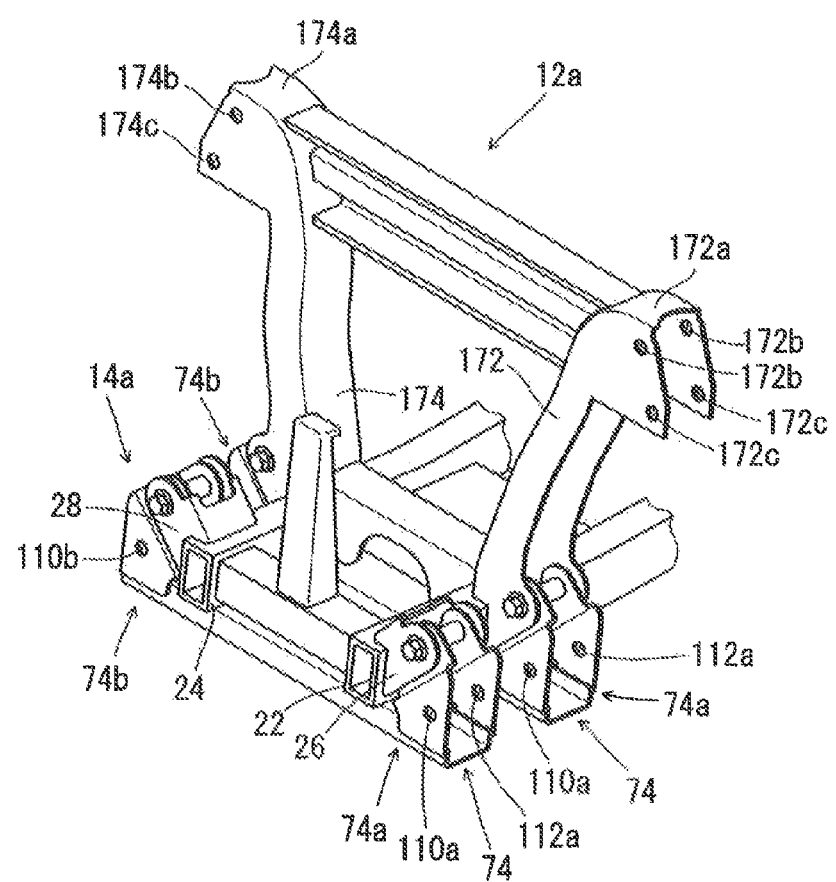
FIG. 14 is a perspective view, showing a front portion of a frame and an adjuster according to another preferred embodiment of the present invention.

FIG. 14 is a perspective view, showing a front portion of a frame 12a and an adjuster 14a according to another preferred embodiment of the present invention. It should be noted that the following description will cover the frame 12a only in terms of differences from the frame 12, without repetitions of commonalities with the frame 12. Likewise, the description will cover the adjuster 14a only in terms of differences from the adjuster 14, without repetitions on commonalities with the adjuster 14.

The frame 12a differs from the frame 12 in that it does not include the support frame members 30, 32 but includes support frame members 172, 174 instead. The adjuster 14a differs from the adjuster 14 in that it does not include the first adjusting member 72.

The support frame member 172 differs from the support frame member 30 in its configuration of an upper end portion 172a. The upper end portion 172a of the support frame member 172 includes a pair of first upper holes 172b and a pair of first lower holes 172c. The pair of first lower holes 172c are located at a lower and more outward position relative to the pair of first upper holes 172b. The location of the first upper holes 172b is, for example, equal or substantially equal to the location of the upper supporting holes 30a (see FIG. 4) of the support frame member 30 (see FIG. 4). The location of the first lower holes 172c is, for example, equal or substantially equal to the location of the first lower holes 88a, 94a (see FIG. 7A and FIG. 7B) when the first adjusting member 72 (see FIG. 5) is fixed to the frame 12 (see FIG. 5).

The support frame member 174 is left-right symmetrical to the support frame member 172 in its configuration. The support frame member 174 differs from the support frame member 32 in its configuration of an upper end portion 174a. The upper end portion 174a of the support frame member 174 includes a pair of first upper holes 174b (the figure shows only one of the first upper holes 174b in the front) and a pair of first lower holes 174c (the figure shows only one of the first lower holes 174c in the front). The pair of first lower holes 174c are located at a lower and more outward position relative to the pair of first upper holes 174b. The location of the first upper holes 174b is, for example, equal or substantially equal to the location of the upper supporting holes 32a (see FIG. 4) of the support frame member 32 (see FIG. 4). The location of the first lower holes 174c is, for example, equal to the location of the first lower holes 88b, 94b (see FIG. 7A and FIG. 7B) when the first adjusting member 72 (see FIG. 5) is fixed to the frame 12 (see FIG. 5).

In the present preferred embodiment, the upper end portion 172a and the upper end portion 174a each represents the first adjusting portion.

When the ground clearance is set to low in a golf cart which includes the frame 12a, the adjuster 14a is not installed, similar to the adjuster 14 is not installed in the golf cart 10. Then, a damper (not illustrated) of a suspension assembly (not illustrated) which supports a left front wheel (not illustrated) is supported by the upper end portion 172a of the support frame member 172 via a support member (a bolt, for example, not illustrated) inserted through the pair of first upper holes 172b. The suspension assembly includes an arm portion (not illustrated), which is supported by the support frame member 26 and a lower end portion of the support frame member 172 similar to the arm portion 122 (see FIG. 12 and FIG. 13). A damper (not illustrated) of a suspension assembly (not illustrated) which supports a right front wheel (not illustrated), is supported by the upper end portion 174a of the support frame member 174 via a support member (a bolt, for example, not illustrated) inserted through the pair of first upper holes 174b. An arm portion (not illustrated) is supported by the support frame member 28 and a lower end portion of the support frame member 174.

When the golf cart's ground clearance is set to high, the pair of second adjusting members 74 are installed to the frame 12a. The damper of the suspension assembly which supports the left front wheel is supported by the upper end portion 172a of the support frame member 172 via a support member (a bolt, for example, not illustrated) inserted through the pair of first lower holes 172c. The arm portion is supported similar to the arm portion 122 (see FIG. 10 and FIG. 11), i.e., by the pair of second adjusting portions 74a. The damper of the suspension assembly which supports the right front wheel is supported by the upper end portion 174a of the support frame member 174 via a support member (a bolt, for example, not illustrated) inserted through the pair of first lower holes 174c. The arm portion is supported by the pair of second adjusting portions 74b.

In this preferred embodiment, the adjuster 14a is installed when the golf cart's ground clearance is set to high, and the adjuster 14a is removed when the ground clearance is set to low. Also, the first lower holes 172c are located at a lower position than the first upper holes 172b and the first lower holes 174c are located at a lower position than the first upper holes 174b. Therefore, similar to the earlier-described golf cart 10, it is possible to move the pair of dampers and the pair of arm portions to an upper (or a lower) position with respect to the frame 12a when adjusting the golf cart's ground clearance. With this arrangement, it is possible to reduce attitude changes in the pair of suspension assemblies before and after the ground clearance adjustment of the golf cart. As a result, the arrangement reduces changes in the camber angles of the front wheels which are supported by the pair of suspension assemblies.

The first lower holes 172c are located outward of a location of the first upper holes 172b, and the first lower holes 174c are located outward of a location of the first upper holes 174b. Also, as described for the golf cart 10 above, the second lower hole 110a and the second lower hole 112a are located outward of a location of the second upper hole 114a (see FIG. 9B), and the second lower hole 110b and the second lower hole 112b (see FIG. 9B) are located outward of a location of the second upper hole 114b (see FIG. 9B). With this arrangement, it is possible to dispose each of the suspension assemblies on an outer side so as to be able to locate the front wheels at positions farther from the frame 12a when the golf cart's ground clearance is set to a higher position. Thus, even if the front wheels have an increased width, it is possible to prevent the front wheels from making contact with the frame 12a. As a result, this arrangement allows the use of larger front wheels.

It should be noted that although the details were not described, conventional strut suspension assemblies including dampers, arm portions and knuckle portions, for example, may be utilized in a golf cart which includes the frame 12a and the adjuster 14a. Constituent members of the suspension assemblies may be changed in design according to the shape of the frame 12a.

In the preferred embodiments described above, description was made for a case where the frame 12a preferably includes the pair of first adjusting portions (upper end portions 172a, 174a). However, configuration of the frame is not limited to the preferred embodiments described above.

Figure 15:
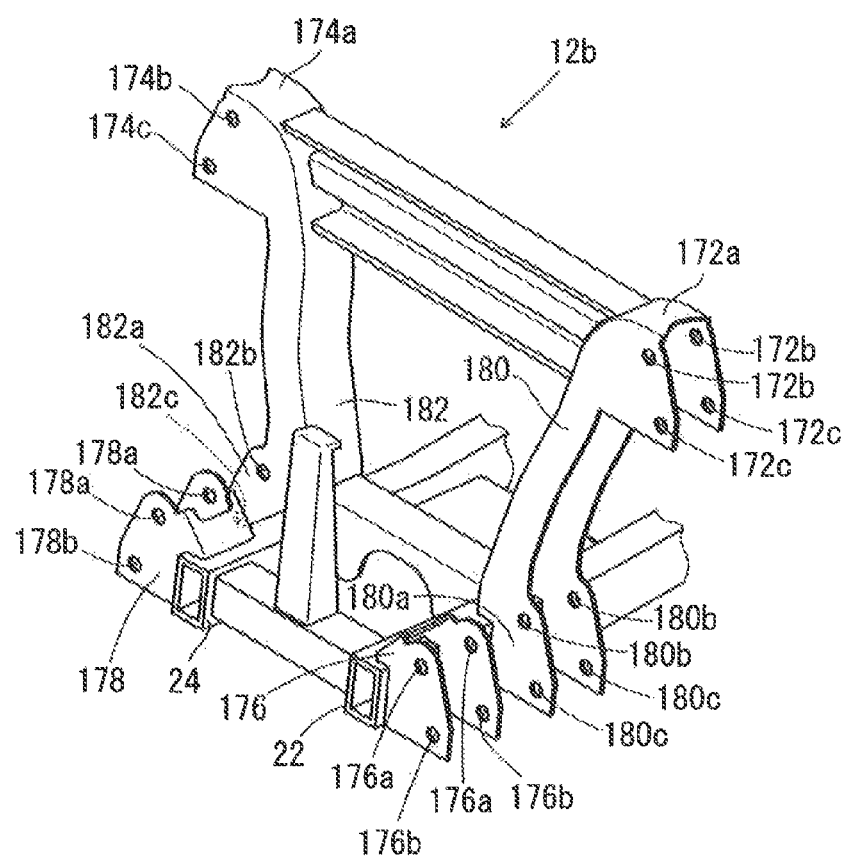
FIG. 15 is a perspective view, showing a front portion of a frame according to still another preferred embodiment of the present invention.

FIG. 15 is a perspective view, showing a front portion of a frame 12b according to still another preferred embodiment of the present invention. It should be noted that the following description will cover the frame 12b only in terms of differences from the frame 12a, without repetitions of commonalities with the frame 12a.

The frame 12b differs from the frame 12a in that it includes support frame members 176, 178 instead of the support frame members 26, 28; and support frame members 180, 182 instead of the support frame members 172, 174.

The support frame member 176, which has the shape of the support frame member 26 but is extended further downward, includes a pair of second upper holes 176a and a pair of second lower holes 176b. The second lower holes 176b are located at a lower and more outward position than the second upper holes 176a. The location of the second upper holes 176a is, for example, equal to the location of the lower supporting holes 26a (see FIG. 4) of the support frame member 26 (see FIG. 4). The location of the second lower holes 176b is, for example, equal to the location of the second lower holes 110a, 112a (see FIG. 5) when the second adjusting portion 74a (see FIG. 5) is fixed to the support frame member 26 (see FIG. 5).

The support frame member 178, which is symmetrical to the support frame member 176 in its shape, includes a pair of second upper holes 178a and a pair of second lower holes 178b (the figure shows only one second lower hole 178b in the front). The second lower holes 178b are located at a lower and more outward position than a location of the second upper holes 178a. The location of the second upper holes 178a is, for example, equal or substantially equal to the location of the lower supporting holes 28a (see FIG. 4) of the support frame member 28 (see FIG. 4). The location of the second lower holes 178b is, for example, equal or substantially equal to the location of the second lower holes 110a, 112b (see FIG. 5 and FIG. 9B) when the second adjusting portion 74b (see FIG. 5) is fixed to the support frame member 28 (see FIG. 5).

The support frame member 180 differs from the support frame member 172 in its configuration of a lower end portion 180a. The lower end portion 180a of the support frame member 180 includes a pair of second upper holes 180b and a pair of second lower holes 180c. The second lower holes 180c are located at a lower and more outward position than a location of the second upper holes 180b. The location of the second upper holes 180b is, for example, equal or substantially equal to the location of the lower supporting holes 30b (see FIG. 4) of the support frame member 30 (see FIG. 4). The location of the second lower holes 180c is, for example, equal or substantially equal to the location of the second lower holes 110a, 112a (see FIG. 5) when the second adjusting portion 74a (see FIG. 5) is fixed to the support frame member 30 (see FIG. 5).

The support frame member 182 is left-right symmetrical to the support frame member 180 in its configuration. The support frame member 182 differs from the support frame member 174 in its configuration of a lower end portion 182a. The lower end portion 182a of the support frame member 182 includes a pair of second upper holes 182b (the figure shows only one of the second upper holes 182b in the front) and a pair of second lower holes 182c (the figure shows only one of the second lower holes 182c in the front). The second lower holes 182c are located at a lower and more outward position than a location of the second upper holes 182b. The location of the second upper holes 182b is, for example, equal or substantially equal to the location of the lower supporting holes 32b (see FIG. 4) of the support frame member 32 (see FIG. 4). The location of the second lower holes 182c is, for example, equal or substantially equal to the location of the second lower holes 110b, 112b (see FIG. 8 and FIG. 9B) when the second adjusting portion 74b (see FIG. 5) is fixed to the support frame member 32 (see FIG. 5).

In the present preferred embodiment, the upper end portion 172a and the upper end portion 174a each represents the first adjusting portion, whereas the support frame member 176, the support frame member 178, the lower end portion 180a and the lower end portion 182a each represents the second adjusting portion.

When setting ground clearance to low in a golf cart which includes the frame 12b, a damper (not illustrated) of the suspension assembly (not illustrated) which supports a left front wheel (not illustrated) is supported by the upper end portion 172a of the support frame member 180 via a support member (a bolt, for example, not illustrated) inserted through the pair of first upper holes 172b. An arm portion (not illustrated) of the suspension assembly is supported by the support frame member 176 via a support member (a bolt, for example, not illustrated) inserted through the pair of second upper holes 176a and by the lower end portion 180a of the support frame member 180 via a support member (a bolt, for example, not illustrated) inserted through the pair of second upper holes 180b. A damper (not illustrated) of the suspension assembly (not illustrated) which supports a right front wheel (not illustrated) is supported by the upper end portion 174a of the support frame member 182 via a support member (a bolt, for example, not illustrated) inserted through the pair of first upper holes 174b. An arm portion (not illustrated) is supported by the support frame member 178 via a support member (a bolt, for example, not illustrated) inserted through the pair of second upper holes 178a and by the lower end portion 182a of the support frame member 182 via a support member (a bolt for example, not illustrated) inserted through the pair of second upper holes 182b.

When a golf cart's ground clearance is set to high, the damper of the suspension assembly which supports the left front wheel is supported by the upper end portion 172a of the support frame member 180 via a support member (a bolt, for example, not illustrated) inserted through the pair of first lower holes 172c. The arm portion is supported by the support frame member 176 via a support member (a bolt, for example, not illustrated) inserted through the pair of second lower holes 176b and by the lower end portion 180a of the support frame member 180 via a support member (a bolt, for example, not illustrated) inserted through the pair of second lower holes 180c. The damper of the suspension assembly which supports the right front wheel is supported by the upper end portion 174a of the support frame member 182 via a support member (a bolt, for example, not illustrated) inserted through the pair of first lower holes 174c. The arm portion is supported by the support frame member 178 via a support member (a bolt, for example, not illustrated) inserted through the pair of second lower holes 178b and by the lower end portion 182a of the support frame member 182 via a support member (a bolt, for example, not illustrated) inserted through the pair of second lower holes 182c.

Again, in this preferred embodiment, the first lower holes 172c are located at a lower position than the first upper holes 172b and the first lower holes 174c are located at a lower position than the first upper holes 174b. The second lower holes 176b are located at a lower position than the second upper holes 176a, and the second lower holes 178b are located at a lower position than the second upper holes 178a. The second lower holes 180c are located at a lower position than the second upper holes 180b, and the second lower holes 182c are located at a lower position than the second upper holes 182b. Therefore, similar to the case of the earlier-described golf cart 10, it is possible to move the pair of dampers and the pair of arm portions to an upper (or a lower) position with respect to the frame 12b when adjusting the golf cart's ground clearance. With this arrangement, it is possible to reduce attitude changes in the pair of suspension assemblies before and after the ground clearance adjustment of the golf cart. As a result, the arrangement reduces changes in the camber angles of the front wheels which are supported by the pair of suspension assemblies.

The first lower holes 172c are located outward of a location of the first upper holes 172b, and the first lower holes 174c are located outward of a location of the first upper holes 174b. The second lower holes 176b are located outward of a location of the second upper holes 176a, and the second lower holes 178b are located outward of a location of the second upper holes 178a. The second lower holes 180c are located outward of a location of the second upper holes 180b, and the second lower holes 182c are located outward of a location of the second upper holes 182b. Due to this arrangement, it is possible to dispose each of the suspension assemblies at an outer side so as to be able to locate the front wheels at positions farther from the frame 12b when the golf cart's ground clearance is set to a high setting. Thus, even if the front wheels have an increased width, it is possible to prevent the front wheels from making contact with the frame 12b. As a result, this arrangement allows the use of larger front wheels.

It should be noted here that although details were not described, conventional strut suspension assemblies including dampers, arm portions and knuckle portions, for example, may be utilized in a golf cart which includes the frame 12b. Constituent members of the suspension assembly may be changed in design according to the shape of the frame 12b.

In the preferred embodiments described above, description was made for cases in which the present invention was preferably applied to a configuration to connect a suspension unit which supports a pair of front wheels to a frame. However, preferred embodiments of the present invention are also applicable to a configuration to connect a suspension unit which supports a pair of rear wheels to a frame.

In the preferred embodiments described above, description was made of a golf cart as an example of a vehicle. However, the present invention is also applicable to other vehicles such as personal transportation vehicles (PTV), for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An adjuster for adjusting a ground clearance of a vehicle that includes a pair of strut suspension assemblies each including a damper, an arm portion, and a knuckle portion, the vehicle including a frame including a pair of first adjusting portions to support the dampers, each of the pair of first adjusting portions including a first upper hole and a first lower hole located at a height lower than the first upper hole to support the damper, the adjuster comprising:

a pair of second adjusting portions each including a second upper hole and a second lower hole, the pair of second adjusting portions arranged to be installed between the arm portions and the frame of the vehicle at a height lower than the pair of first adjusting portions to adjust a position of the frame with respect to the arm portions; wherein each of the second lower holes is located outward of a location of a corresponding second upper hole in a vehicle width direction;

each of the second lower holes is configured to be connected to the arm portion; and each of the second upper holes is configured to be connected to the frame.

2. The adjuster according to claim 1, wherein the pair of second adjusting portions are integral with each other and included in a second adjusting member.

3. A vehicle comprising:
a pair of strut suspension assemblies each including a damper, an arm portion, and a knuckle portion; and
the adjuster according to claim 1.

4. The vehicle according to claim 3, further comprising:
an operation controller;
a pair of tie rods working in association with the operation controller and connected to the pair of knuckle portions in the pair of suspension assemblies, respectively; and
a pair of spacers each located between the tie rod and the knuckle portion; wherein
each of the knuckle portions includes a connecting portion to connect the knuckle portion to the tie rod; and
each of the tie rods is connected to the connecting portion via the spacer.

* * * * *